US012156101B2

United States Patent
Jordahl et al.

(10) Patent No.: US 12,156,101 B2
(45) Date of Patent: Nov. 26, 2024

(54) REGISTRATION AND MODE SWITCHING FOR DEVICES IN A DISTRIBUTED AUDIO SYSTEM

(71) Applicant: Lightspeed Technologies, Inc., Tualatin, OR (US)

(72) Inventors: David M. Jordahl, Estacada, OR (US); Robert Paul D'Angelo, Sr., Portland, OR (US); Baiqiang Ren, Richmond (CA); Michael A. Frost, Portland, OR (US); Jonathan Umfleet, Newberg, OR (US); Shaun Fagan, Sherwood, OR (US)

(73) Assignee: Lightspeed Technologies, Inc., Tualatin, OR (US)

( * ) Notice: Subject to any disclaimer, the term of this patent is extended or adjusted under 35 U.S.C. 154(b) by 186 days.

(21) Appl. No.: 17/737,639

(22) Filed: May 5, 2022

(65) Prior Publication Data
US 2022/0360949 A1 Nov. 10, 2022

Related U.S. Application Data

(60) Provisional application No. 63/184,677, filed on May 5, 2021.

(51) Int. Cl.
| | |
|---|---|
| H04W 4/06 | (2009.01) |
| H04M 1/04 | (2006.01) |
| H04M 3/56 | (2006.01) |
| H04W 60/04 | (2009.01) |

(52) U.S. Cl.
CPC .............. *H04W 4/06* (2013.01); *H04M 1/04* (2013.01); *H04M 3/563* (2013.01); *H04W 60/04* (2013.01)

(58) Field of Classification Search
CPC ....... H04W 4/06; H04W 60/04; H04W 12/50; H04W 24/02; H04W 4/80; H04W 88/10; H04M 1/04; H04M 3/563; H04M 1/72502
See application file for complete search history.

(56) References Cited

U.S. PATENT DOCUMENTS

| 7,620,795 B1 * | 11/2009 | Ryser ................... G06F 9/3861 |
| | | 712/9 |
| 11,212,326 B2 * | 12/2021 | Faulkner ............... H04M 3/568 |
| 2018/0199147 A1 * | 7/2018 | Arriaga ................... H04W 4/80 |

OTHER PUBLICATIONS

Igorevich, Spazhakin Michael, and Tokarev Anton Borisovich. "Digital receiver for addressed direction finding of modern communication standards." 2015 International Siberian Conference on Control and Communications (SIBCON). IEEE, 2015 (Year: 2015).*

* cited by examiner

*Primary Examiner* — Sharad Rampuria
(74) *Attorney, Agent, or Firm* — Klarquist Sparkman, LLP

(57) ABSTRACT

Technologies are described for a distributed audio system configured to switch operating modes. In some examples, the distributed audio system may include a device configured to execute first instructions from a first memory corresponding to operation in a first mode, receive a signal to switch modes, and, responsive to receiving the signal, switch a select signal corresponding to the first memory to select a second memory. Responsive to selecting the second memory, the device may be configured to execute second instructions from the second memory corresponding to operation in a second mode. The device may enter a registration mode to register portable parts to the device.

19 Claims, 16 Drawing Sheets

REGISTRATION AND MODE SWITCHING FOR DEVICES IN A DISTRIBUTED AUDIO SYSTEM

CROSS REFERENCE TO RELATED APPLICATION

This application claims priority from U.S. Provisional Application No. 63/184,677, filed May 5, 2021, which application is incorporated by reference herein in its entirety.

FIELD

This disclosure relates to a classroom system that coordinates the transmission of audio signals to and from various locations in a classroom.

SUMMARY

In a traditional classroom environment, a teacher stands in front of a large number of students (e.g., 15-30 students in a typical classroom) and lectures to the entire class. Because of this setup, the teacher presents the same lecture in the same manner to every student in the class. If a student wishes to ask a question, the teacher must pause the lesson for the entire class to answer the student's question. This model can be inefficient when students in the classroom are of varying academic abilities in a particular subject or have different learning styles.

An emerging model of classroom instruction involves separating a classroom of students into several small groups (e.g., groups of 3-6 students). Students can be grouped together based on having similar learning styles, academic ability, or other factors. One or more teachers can then address each group of students individually to provide more personalized instruction to each student in a class.

One challenge with this model of instruction is that it can be difficult for a teacher to manage the classroom activity of each of the various groups. This can be addressed using a distributed audio system that can allow a teacher can easily communicate remotely with any of the groups of students.

In such a classroom environment a second teacher or assistant teacher may be present, who can also communicate remotely with groups of students. The teacher and the assistant may be allowed to use mobile devices such as smart phones to select which group or groups of students they communicate with at any given time. The teacher and the assistant may also be allowed to record audio of their interactions with the students through the smart phone devices and to playback audio from the smart phones or from other outside sources coupled to the smart phones.

In order to achieve the above functionality, the distributed audio system may include various components, including those serving as a portable part (e.g., an end point radio frequency device, such as a remote speaker or microphone) or a fixed part (e.g., a base radio frequency device through which audio is routed to/from the portable parts). In certain embodiments, the components can operate and/or be configured in accordance with the Digital Enhanced Cordless Telecommunications (DECT) standard. For example, in certain embodiments the portable parts (or switchable devices configured to operate in a portable part mode) can include devices configured to access a fixed network (e.g., a fixed telephone network) via radio, and the fixed part/base station (or switchable device configured to operate in a fixed part mode) can include devices used to terminate the radio link and provide access to a fixed line. Accordingly, fixed parts can be positioned as intermediary devices between one or more portable parts and an external network (and capable of directly connecting to multiple portable parts), while portable parts can be positioned as end point devices that are not directly connected to other portable parts. The disclosure introduces a new category of component to be used in the distributed audio system, which serves as a switchable part that is able to be switched between a portable part mode and a fixed part mode. Introducing a switchable part into the system increases flexibility when upgrading or reconfiguring the system. For example, a switchable device can be initially set to a fixed part mode and serve as a base station in the distributed audio system, and later set to a portable part mode and serve as a remote speaker and/or to upgrade an existing installation of a fixed point wireless microphone system to be used with a single fixed point base station. As another example, the switchable device can be switched from the portable part mode to a fixed point mode to replace an existing base station that is removed from the system (e.g., to upgrade the system and/or to replace a unit that is not functioning properly). The switchable part can be controlled to toggle between modes through the use of a push button switch or an infrared signal. As will be described in more detail below, the mode switching can be executed by selecting a corresponding memory register that is programmed for the selected mode.

The disclosure also describes a one-button registration (or pairing) procedure and related features, which can be used to register a device within the distributed audio system using a single button press. The described one-button registration procedure allows the registration to be performed more easily by reducing the number of components with which a user interacts to complete the registration process. For example, in other approaches, a registration is performed by pressing a button on both the device being registered (e.g., a portable part) and a base station or other centralized device in the distributed audio system (e.g., a fixed part). As the fixed part device can be positioned in a more permanent/difficult to reach location of an environment (e.g., a classroom), the involvement of physical interaction with the fixed part to complete registration of the portable part introduces difficulty to the registration process. The described one-button registration procedure of the present disclosure alleviates this difficulty by removing physical user interaction with the fixed part during the registration. For example, as will be described in more detail below, in certain embodiments an infrared command can be triggered in association with the portable part (e.g., via a button press on the portable part or connected controller and/or via a cradle charger command triggered by the placement of the portable part in the charger) and sent to the fixed part of the audio system to commence the registration of the portable part without any further button presses or user involvement.

In one example of the present disclosure, a method of switching operational modes in a device of an audio system includes executing, by a processor of the device, first instructions from a first memory corresponding to operation in a first mode, receiving a signal to switch modes, responsive to receiving the signal, switching a select signal corresponding to the first memory to select a second memory, and, responsive to selecting the second memory, executing, by the processor, second instructions from the second memory corresponding to operation in a second mode.

In another example of the present disclosure, a switchable part device in an audio system includes a processor, a first memory storing instructions associated with a first operating mode, a second memory storing instructions associated with a second operating mode, and a field-programmable gate array (FPGA) configured to switch operation of the switchable part device between the first operating mode and the second operating mode by switching select signals corresponding to the first and second memory.

In still another example of the present disclosure, a distributed audio system includes a switchable part device in an audio system, and the switchable part device includes a processor, a first memory storing instructions associated with a first operating mode, a second memory storing instructions associated with a second operating mode, and a field-programmable gate array (FPGA) configured to switch operation of the switchable part device between the first operating mode and the second operating mode by switching select signals corresponding to the first and second memory, wherein the first memory or the second memory further stores instructions executable by the process to enter a registration mode for performing a Digital Enhanced Cordless Telecommunications (DECT) registration of a portable device responsive to a single button press received at the portable device or responsive to receiving a registration signal from a charging cradle for the portable device.

The foregoing and other objects, features, and advantages of the disclosed technology will become more apparent from the following detailed description, which proceeds with reference to the accompanying figures.

DETAILED DESCRIPTION

Introduction

Explanation of Terms

Figure 1:
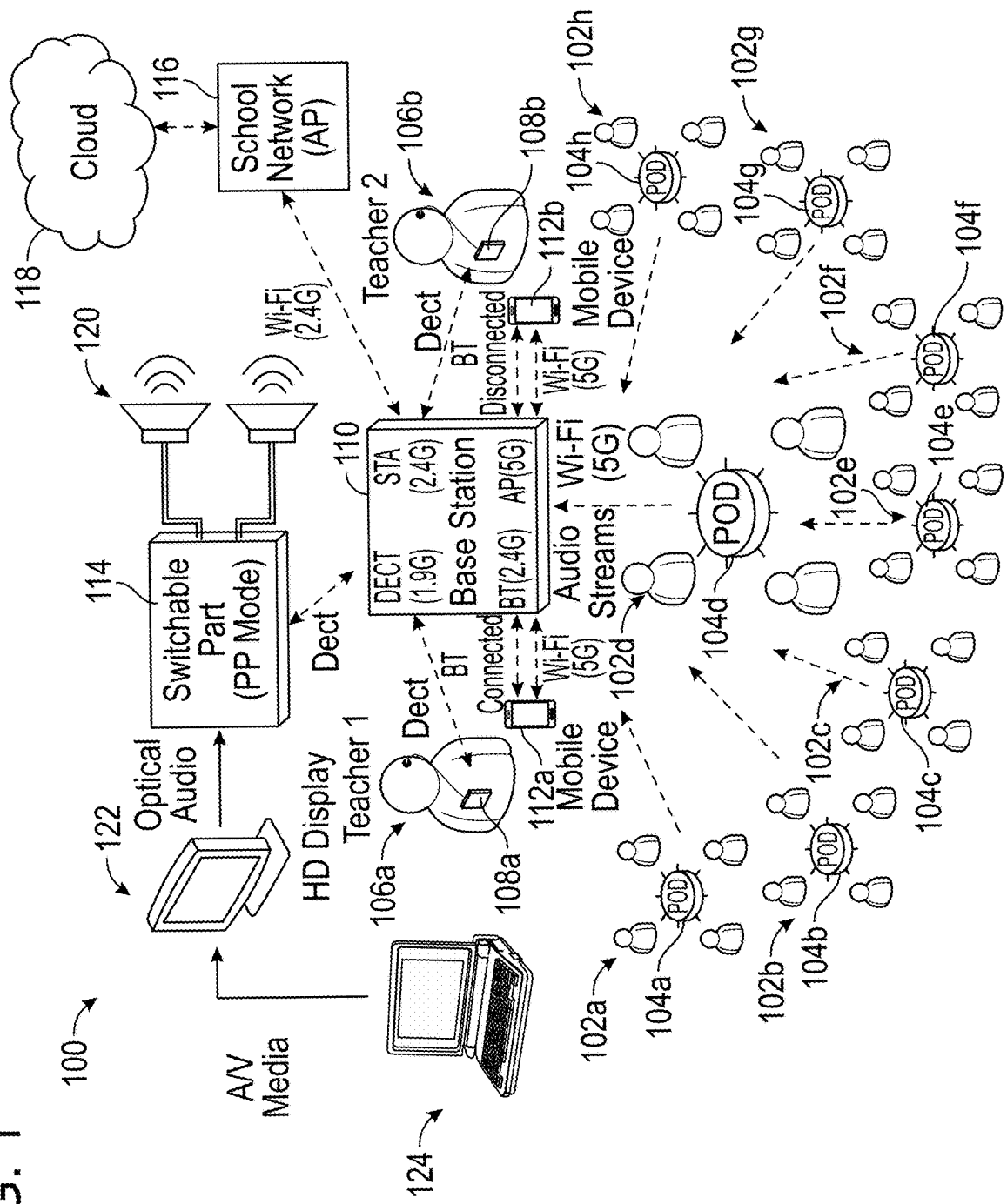
FIG. 1 shows an example distributed audio system, according to one embodiment.

For purposes of this description, the terms instructor and teacher are to be broadly construed to mean not only teachers in a classroom, but other individuals, such as individuals who are overseeing or directing an event such as a workshop, lecture, or other activity such as where attendees in the room are broken up into a plurality of small groups. The term classroom includes such other environments beyond a traditional classroom for elementary, high school or college students. Thus, individuals such as leaders, emcees, directors, overseers and other individuals fall under the definition of instructor even if they are not technically teaching or providing instruction to attendees. In the same manner, the term student or students are to be broadly construed to include any individuals who are involved in using a system. However, a distributed audio system has particular applicability to a classroom learning environment where both distributed and large group teaching of students in a classroom is taking place. To the extent the examples described herein are referring to a classroom or teaching environment, this is an illustrative example of a relevant environment, but not a limitation on the applicability of the system.

In this disclosure the words "a" and "an" are to be construed to include the singular and the plural unless otherwise stated such as by using the word only. Thus, if there are a plurality of particular elements, there is also "a" or "an" of the particular elements. In addition the phrase "coupled to" encompasses direct connection elements as well as indirect connection of elements through one or more other elements. Also, the term blocked with reference to audio pathways simply means that audio information does not pass along the pathway, whether a physical path is interrupted or audio information is not flowing through the path. Also, pathways can include, but are not limited to channels, such as RF frequency channels or channels between Bluetooth® connected devices, but can also include data flow paths such as where data passes along a common path with the data being coded or otherwise separable with the separated data being deemed to have passed along a respective associated pathway. Audio pathways also include audio links between components. A control data pathway or an audio pathway can comprise two separate channels, one channel for transmitting data with a transmitter and one for receiving data with a receiver. Alternatively, a control data pathway or an audio pathway can comprise a single channel for both transmitting and receiving data with a transceiver.

The phrase "each element includes" does not preclude the presence of other similar elements that lack some of the components specified by the phrase "each element includes" as the other similar elements would not be within the phrase "each element includes" if it lacks some of the included items. As a specific example, the phrase each speaker unit of a system includes a speaker and a transmitter does not preclude the existence of speakers in the system without transmitters as the speakers without transmitters would not in this example be speaker units. Also, the term "and/or" is to be broadly construed to include "and", "or" and both "and" and "or".

The phrase "mobile device" as used in this application means a device that can be carried from place to place by a user and one that is capable of recording audio information, or playing back audio information, or both recording and playing back audio information; that is capable of transmitting audio information, receiving audio information or both transmitting and receiving audio information; with the transmission and receipt of audio information being accomplished at least wirelessly, such as using Bluetooth® enabled protocols. Such mobile devices can be capable of sending and receiving both audio and video information, storing audio and video information, playing back audio and video information, and transmitting audio and video information at least wirelessly. Examples of mobile devices include: (i) smart phones such as models of IPHONES® from Apple Inc., and models of GALAXY® phones from Samsung Electronics Co., Ltd., (ii) tablet computers such as models of IPAD® from Apple Inc., and models of Surface® from Microsoft Corporation; (iii) personal digital assistants such as models of PalmPilot® from Palm, Inc.; (iv) lap top computers. Generally, the mobile devices can include handheld devices making them readily portable.

First and second signals correspond to one another if all, substantially all, or at least a majority of the content of the signals is found in each of the signals. Thus, for example, during transmission through various components, audio signals correspond to one another even though formatting, some content, and manners of transmission are changed.

By way of example, Distributed Audio Systems (DAS) can facilitate newly emerging teaching methodologies which redefine the way teachers and students interact within the classroom. In this new environment, teachers balance whole-group instruction with managing several small groups of students by orchestrating instructional and collaborative activities. The dispersal of the students into separate groups places a greater demand on teachers to be more mobile and better able to redirect their attention across a wider field. A DAS allows the teacher to provide basic learning and setup instructions for small group activities and then to selectively monitor and address each group individually. Furthermore, this can be done without the teacher needing to be in close proximity (e.g. the teacher can be across the room from) a selected group.

Small group instruction can be used to group students together based on similar academic skills or learning styles so that they are essentially equal in their development and can digest content at the same rate or level. In a classroom, there are typically students at different levels of ability in a subject. In a math lesson for example, some groups might be just learning the basic parts of fractions, while other groups might be working on complex story problems to apply their understanding of fractions to real life situations. Another way to group students would be a hybrid of students at different levels. This would be more of a peer-to-peer instruction model where perhaps those at higher levels help others. This can also be effective as students can often learn better from their peers and the teaching of content can lead to mastery.

One of the largest challenges with small group instruction is the management of classroom activities and ongoing assessment of the students. DAS embodiments can allow the teacher immediate audio access to all students in the class, both for monitoring and directing student activity.

An example classroom setup might be structured in the following way: a) 35% of the day=whole group; 65%=small group; b) 1 teacher is most common—there are cases where there might be an assistant, volunteer, or subject specialist off and on; c) 3-5 student groups located at stations in the room; d) Additional students might be doing individual work like silent reading, guided activities on a computer, or independent worksheets; e) Students sometimes rotate from station to station. The stations could be large tables, small desks pushed together, or a carpeted area on the floor; f) Depending on teaching-styles or subject matters the teacher could be doing any of the following: i) Staying in one station with the students rotating to the teacher; ii) Rotating to the different stations throughout a lesson to work with each of the groups; iii) Roaming the classroom helping individual groups as they need it, and assessing the activities. DAS embodiments can comprise multiple portable speaker units that can be placed with each individual group in the classroom. The teacher can have a microphone and control that will help manage the activities in the classroom. DAS can give the teacher the ability to address any of plural different groups individually (for example, six such groups of six speaker units are included in one illustrated system) regardless of where she/he is located, so as not to disturb the entire class. The teacher can monitor small group activities to assess the learning and redirect when necessary. When the teacher needs to address the full class, she/he can do so by talking to all speaker pods in the classroom. More so than an audio system, DAS can become a classroom management tool that can allow a teacher to facilitate a small-group learning environment.

The system can be configured to be able to selectively record audio information from any of the classroom groups, such as for later analysis of the effectiveness of the teaching methods and the students' grasps of the subject matter. In addition, the system can be configured to be able to playback audio, from, for example a remote source to one or more selected groups of students. The audio can be played back with accompanying video displayed on a television or other display visible by the group of students to which the audio is directed or to an entire classroom. For example, a mobile device can be able to access information over a wireless internet connection, such as a YouTube® audio/video presentation or a Ted Talks® presentation and present this to the students. Each instructor in a classroom (such as two or more instructors) can be able to be able to wirelessly control the system using a mobile device. During recording by one of the mobile devices or playback by or through one of the mobile devices, the other mobile device or devices can be blocked from transmitting information that can interfere with the recording or playing back of information by or through the said one of the mobile devices.

Advantages of this approach can include one or more, or all, of the following: a) Teacher can audibly address any one of the groups individually; b) When the teacher is providing direct instruction to one group, the speaker pod provides improved speech intelligibility in an often noisy environment; c) Two way communication between small groups and the teacher allows for quick conversations; d) Teacher can address all pods at once to allow for whole group instruction; e) Teacher monitoring of all small groups from anywhere in the classroom; f) Teacher can monitor groups without them knowing—behavior does not change; g) Allows for continuous, ongoing assessment; h) Student microphone at each group, eliminating the need and inconvenience of a pass-around microphone—one pod can broadcast to all pods; i) Allows for plural (e.g. two) teacher microphones to work in one classroom; j) Allows for at least two mobile devices that can be operated by separate instructors to remotely control the system; k) Allows for the mobile devices to selectively record audio information from one or more student groups or pods and playback audio to one or more pods; 1) Reduces interference by blocking out transmission of information by all but one of the mobile devices during recording or playing back of audio information by or through said one of the mobile devices; m) Allows for control of the system using radio control signals and the passage of audio data wirelessly by way of radios.

Example Systems

With reference to FIG. 1, an example distributed audio system 100 in an education environment is shown, according to one embodiment. The following example describes implementation of the systems and methods described herein in the context of a classroom environment for purposes of illustration, but the disclosed systems and functionality can be implemented in any of a variety of settings as noted above. In the illustrated example, a plurality of groups of students 102a-102h are gathered about respective pods 104a-104h. The number of groups of students and students within each group is illustrative and can be varied in other examples. Each of the pods 104 include a microphone or microphone array for detecting audio signals from the respective associated group of students. Optionally, one or more of the pods 104 can also include a loudspeaker or loudspeaker array to output audio to the respective associated group of students. The illustrated example also shows two teachers 106a and 106b, equipped with a respective microphone 108a and 108b. Each of the microphones 108 include a microphone or microphone array for detecting audio signals from the respective associated teacher. The pods 104 and/or microphones 108 can also include one or more related user interface features, such as light arrays to indicate talk/mute status, volume input/output levels, battery status, and/or other indicators, volume control buttons, a talk/mute button, etc.

The distributed audio system 100 includes a base station 110, which is a centralized component supporting charging and audio routing of the pods 104, microphones 108, and other components of the system, such as mobile devices 112a and 112b, switchable part (operating in portable part mode) 114, a network access point 116 of the environment (e.g., which can be connected to a cloud computing environment 118 and/or the Internet), etc. The base station 110 can be configured to communicate via one or more wireless connections, examples of which are shown in FIG. 1 (e.g., BLUETOOTH, WIFI, Digital Enhanced Cordless Telecommunications [DECT], etc.). It is to be understood that the illustrated connection types are exemplary, and any suitable communication protocol can be used to transmit data between the various components of system 100. In this way, the base station 110 serves as a fixed part of the DAS (in accordance with the DECT standard), while pods 104, switchable part 114, and microphones 108 serve as portable parts of the DAS (in accordance with the DECT standard). In some examples, base station 110 includes a fixed part device (e.g., a device configured to operate as a fixed part). In other examples, base station 110 includes a switchable part device operating in a fixed part mode (e.g., a device configured to be switchable between a fixed part mode and a portable part mode, and operating in the fixed part mode).

As shown, the switchable part 114 can include and/or be coupled to one or more loudspeakers 120. The loudspeakers 120 can be localized and/or configured to provide sound throughout the environment (e.g., ceiling speakers mounted in a classroom). The illustrated example provides one configuration in which the switchable part 114 receives audio signals (e.g., optical audio in the non-limiting illustrated example) from a display device 122, which receives audio/video data from a portable computing device 124. For example, teacher 1 can control a presentation via portable computing device 124, the visual content of which is presented on display device 122 and the audio content of which is presented via loudspeakers 120 for the entire classroom to experience. As further shown, the switchable part 114 can receive and/or send audio signals from/to the base station 110. For example, received signals (e.g., audio from the microphones 108 and/or the pods 104) can be routed through the base station 110 to the switchable part 114 for output via loudspeakers 120. In some examples, the audio from the display device 122 (e.g., the presentation audio) can be propagated from the switchable part 114 to the base station 110 to pods 104 for localized output. Similar routing can be performed to propagate audio to/from the network access point 116.

Figure 2:
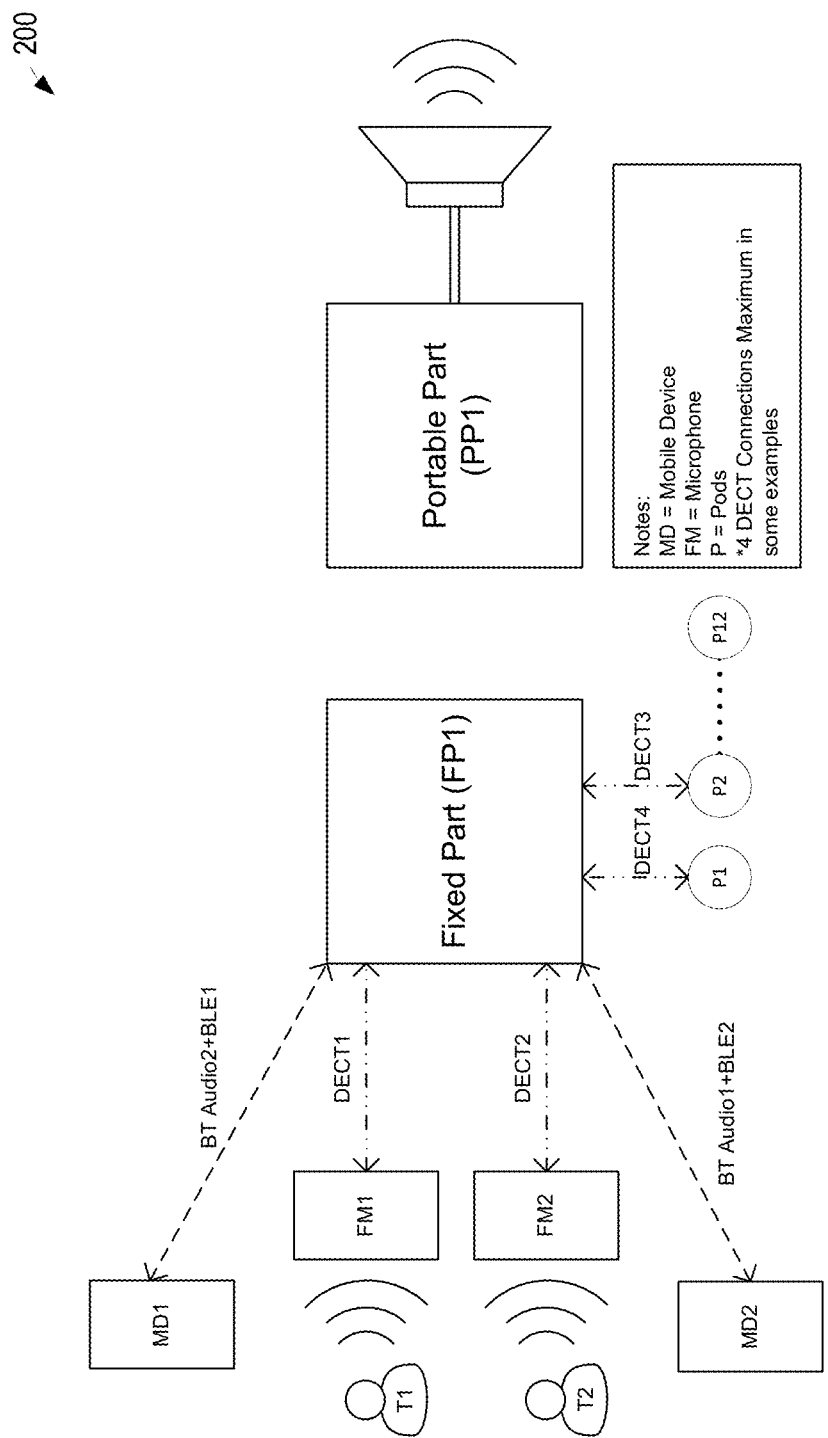
FIGS. 2-5 show additional example configurations of distributed audio systems.
Figure 3:
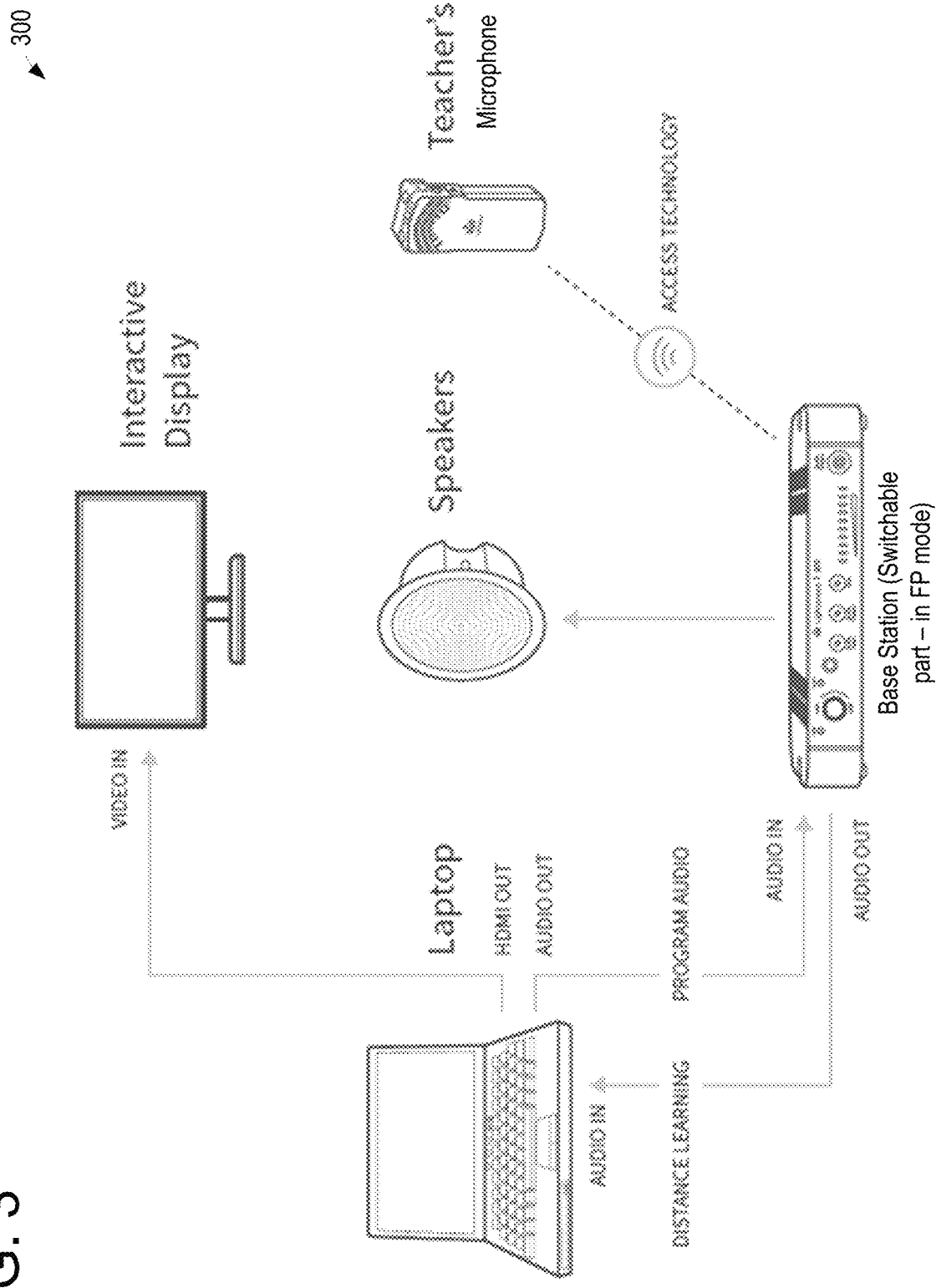
Figure 4:
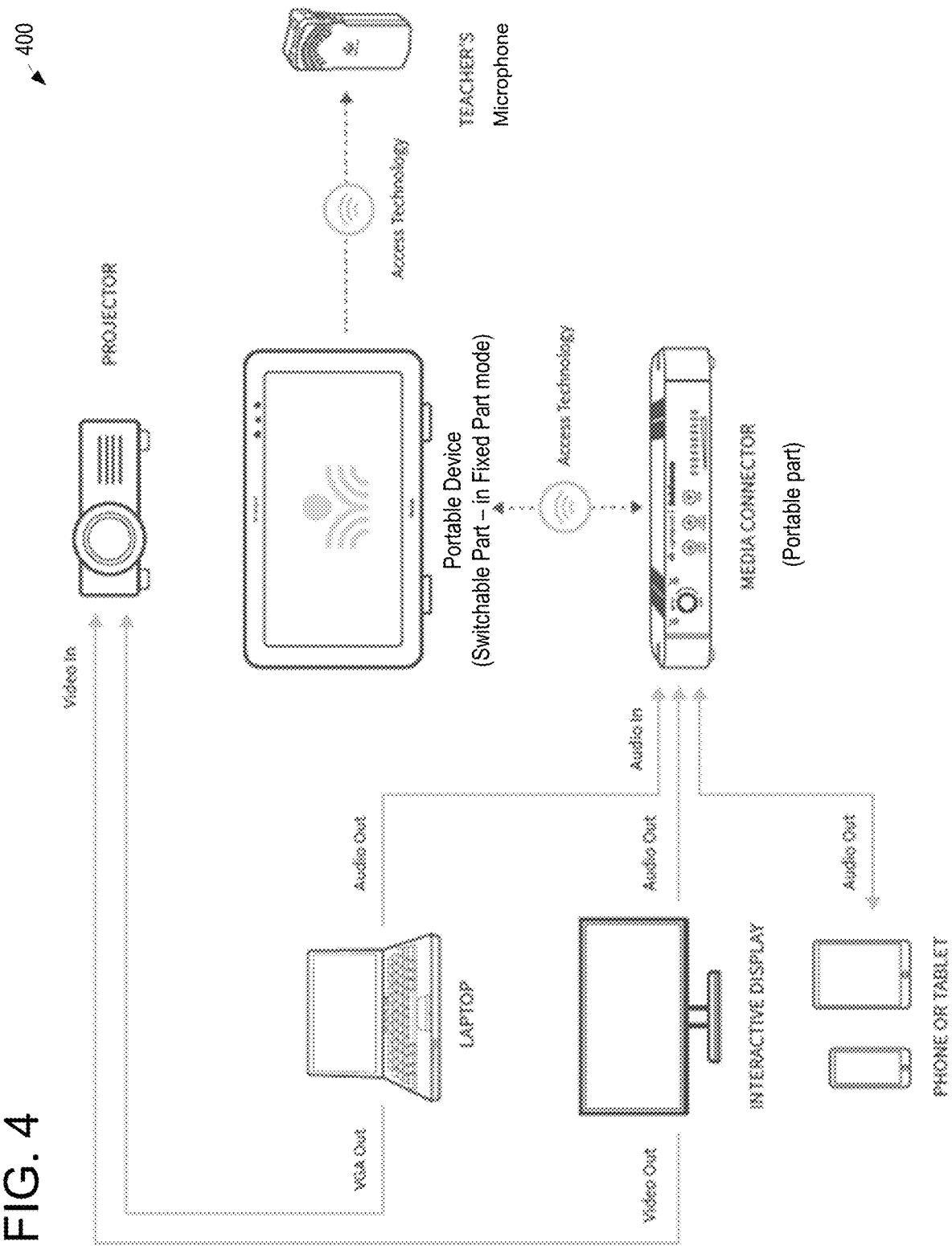
Figure 5:
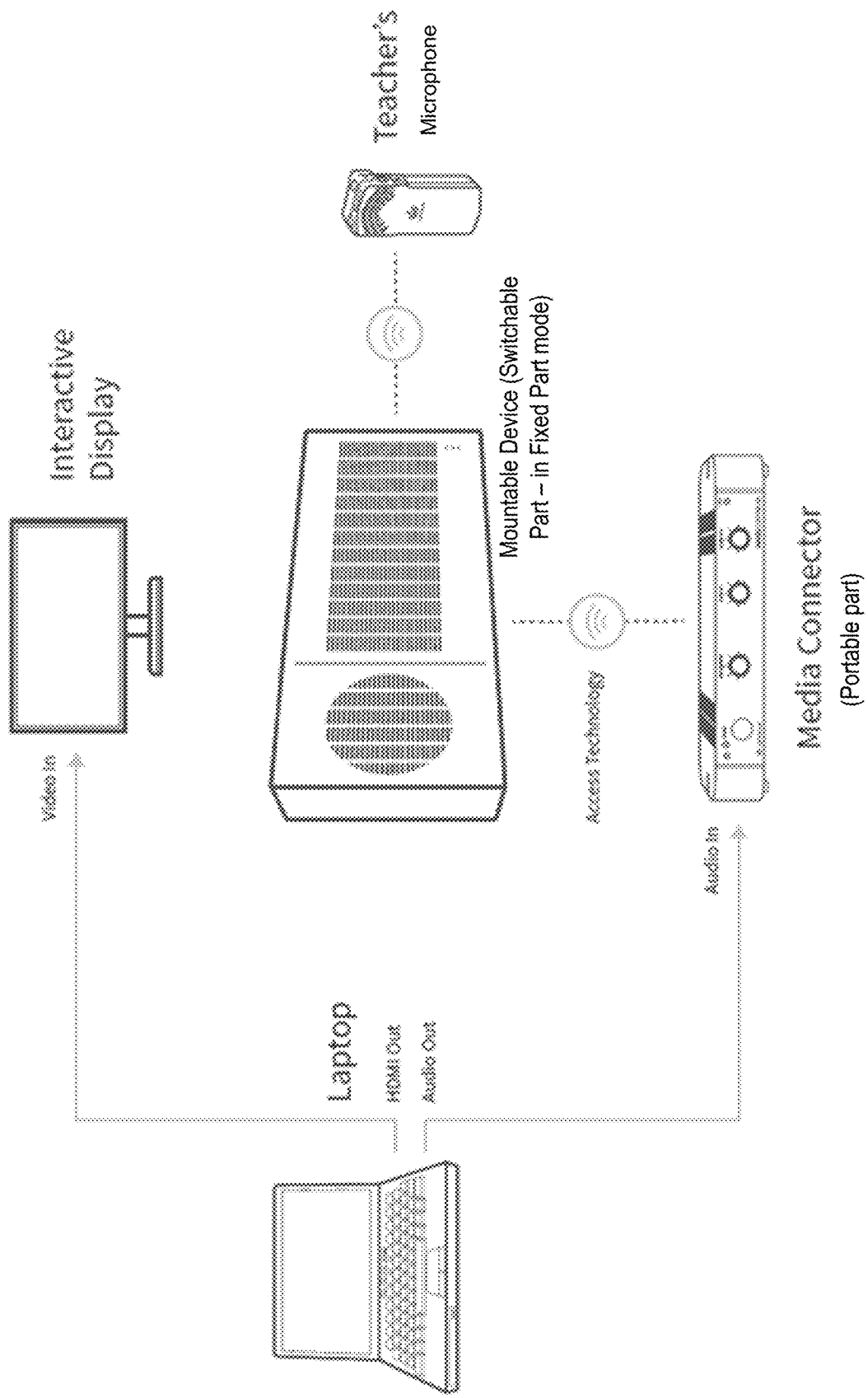

As described above, FIG. 1 shows one exemplary environments for components to be discussed in further detail throughout this disclosure. Additional example configurations of components are shown in FIGS. 2-5. In each configuration, a component of the system can be configured as a switchable part and can be used interchangeably as a portable part or a fixed part (e.g., a base station) in the system based on a mode in which the device is placed. For example, FIG. 2 shows a simplified environment 200 in which speech from two teachers (T1 and T2) is detected by respective microphones (FM1 and FM2). Respective audio signals from the microphones, mobile devices (MD1 and MD2), and pod devices (P1, P2, . . . P12) are propagated to/from a fixed part component FP1. A portable part PP1 is connected to a loudspeaker. According to the present disclosure, a switchable part can be configured as the fixed part FP1 or as the portable part PP1 based on a mode selector in the switchable part. In FIGS. 3-5, the switchable part (in fixed part mode) is identified as the base station in example system 300 of FIG. 3, the portable device in example system 400 of FIG. 4, and the mountable device in example system 500 of FIG. 5.

Example Switchable Part Configurations

Figure 6:
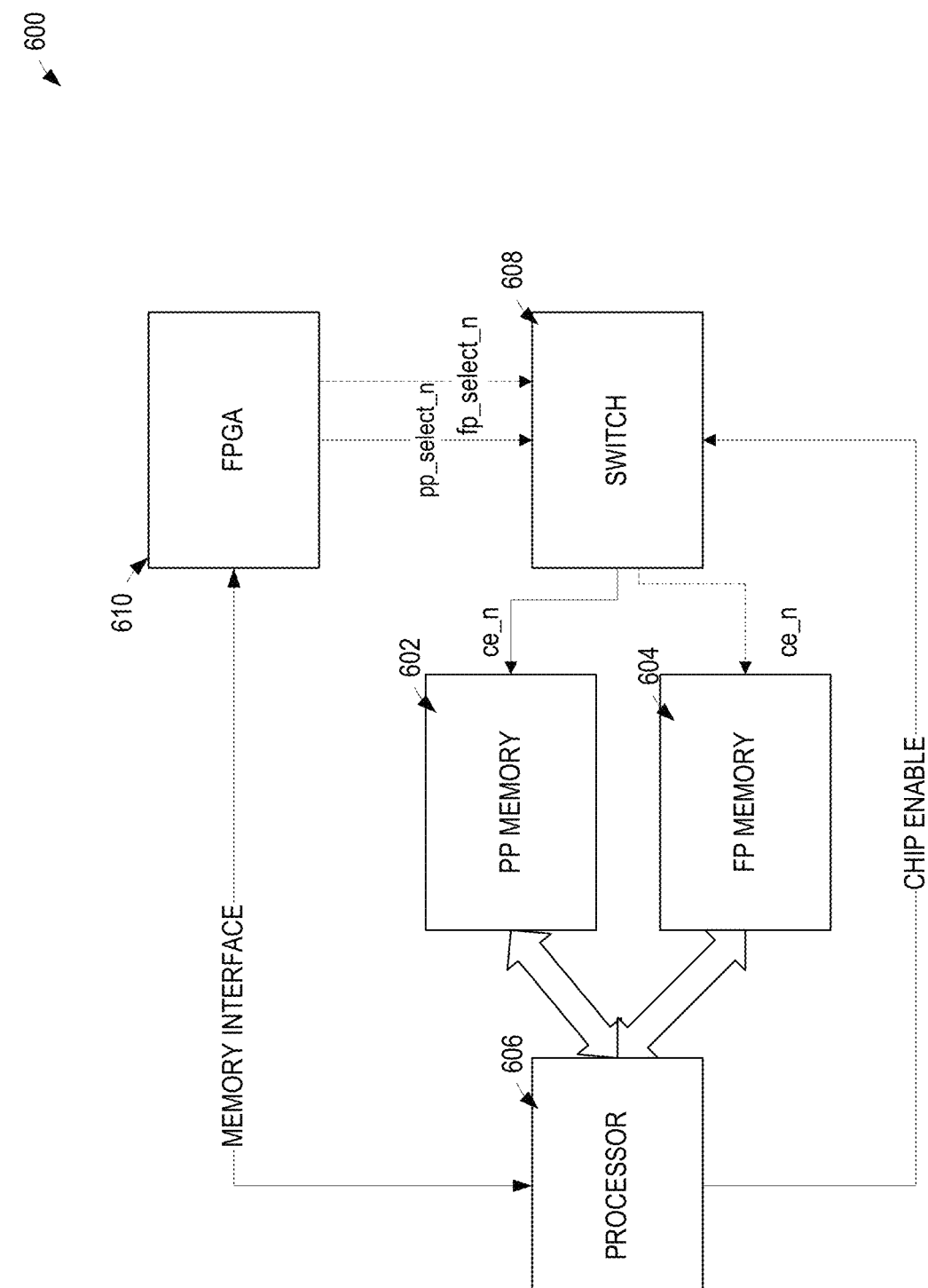
FIG. 6 shows a block diagram of an example system for switching operational modes in a switchable part device, according to one embodiment.

FIG. 6 shows an example block diagram showing a system 600 for achieving the switchable part functionality described above. For example, the components of FIG. 6 can be included in a device, such as a media connector, that is configured to be switchable between a portable part mode and a fixed part mode.

The system 600 includes two discrete memories 602 and 604. The memories can be two discrete non-volatile memory devices in some examples. In other examples, the memories can be two discretely addressable locations of a single non-volatile memory device. The first memory 602 is configured as a portable part memory and stores instructions (e.g., executable by a processor of the device) for operating the device in a portable part mode. The second memory 604 is configured as a fixed part memory and stores instructions (e.g., executable by the processor of the device) for operating the device in a fixed part mode. Differences in the portable part and the fixed part modes are described in more detail below with respect to FIGS. 8 and 9. For example, the portable part memory can include digital signal processing instructions for a single incoming audio signal, while the fixed part memory can include digital signal processing instructions for multiple incoming audio signals (e.g., including instructions to mix the multiple signals). Each of the memories are coupled to a processor 606, which is configured to execute the instructions stored in the memory that is selected. For example, the processor 606 can be configured to only execute instructions from one of the memories 602/604 at a time (e.g., the processor can execute instructions from only one of the memories until a reset of the system, at which time the processor can switch to execute instructions from only the other one of the memories).

In order to switch modes, the processor 606 receives an input signal responsive to user input (e.g., an infrared signal from a (e.g., remote) mode switching controller [which can be implemented in another portable device, such as a pod, microphone, mobile device, etc., or a remote associated with any of the above described devices] and/or a local signal from a button on the device) and, in response, the processor sends a chip enable signal to the switch 608 and programs a non-volatile chip (e.g., mode) select bit in flash memory of a field-programmable gate array (FPGA) 610 to switch to the requested mode (e.g., 0 for fixed part and 1 for portable part, or vice versa). The processor 606 then sends a signal to a field-programmable gate array (FPGA) 610 to initiate the switch operation. The FPGA 610, in response, instructs the switch 608 to set an appropriate select signal (e.g., pp_select_n for portable part mode or fp_select_n for fixed part mode), resets itself, and sends a reset signal to the processor with timing information (e.g., to synchronize the reset of the components of the system 600). The switch 608 then asserts the chip enable (received from the processor 606) to the memory associated with the select signal received from the FPGA 610. For example, when switching to the PP mode, the FPGA sets the pp_select_n signal, causing the switch to assert the chip enable (ce_n) signal to the PP memory 602, as shown by the solid line. When switching to the FP mode, the FPGA sets the fp_select_n signal, causing the switch to assert the chip enable (ce_n) signal to the FP memory 604, as shown by the dashed line. In this way, the chip enable routing is changed dependent on which memory is selected. The chip enable is an active signal used to address memory under normal operation, and is a implemented on a high speed line.

The above chip enable mechanism can be used when the PP and FP memories are implemented as discrete memory devices. In other examples, in which the PP and FP memories are different portions of a single device, the switch 608 can be used to select or activate different address pins to select the respective portions of memory instead of using the chip enable signal.

Figure 7:
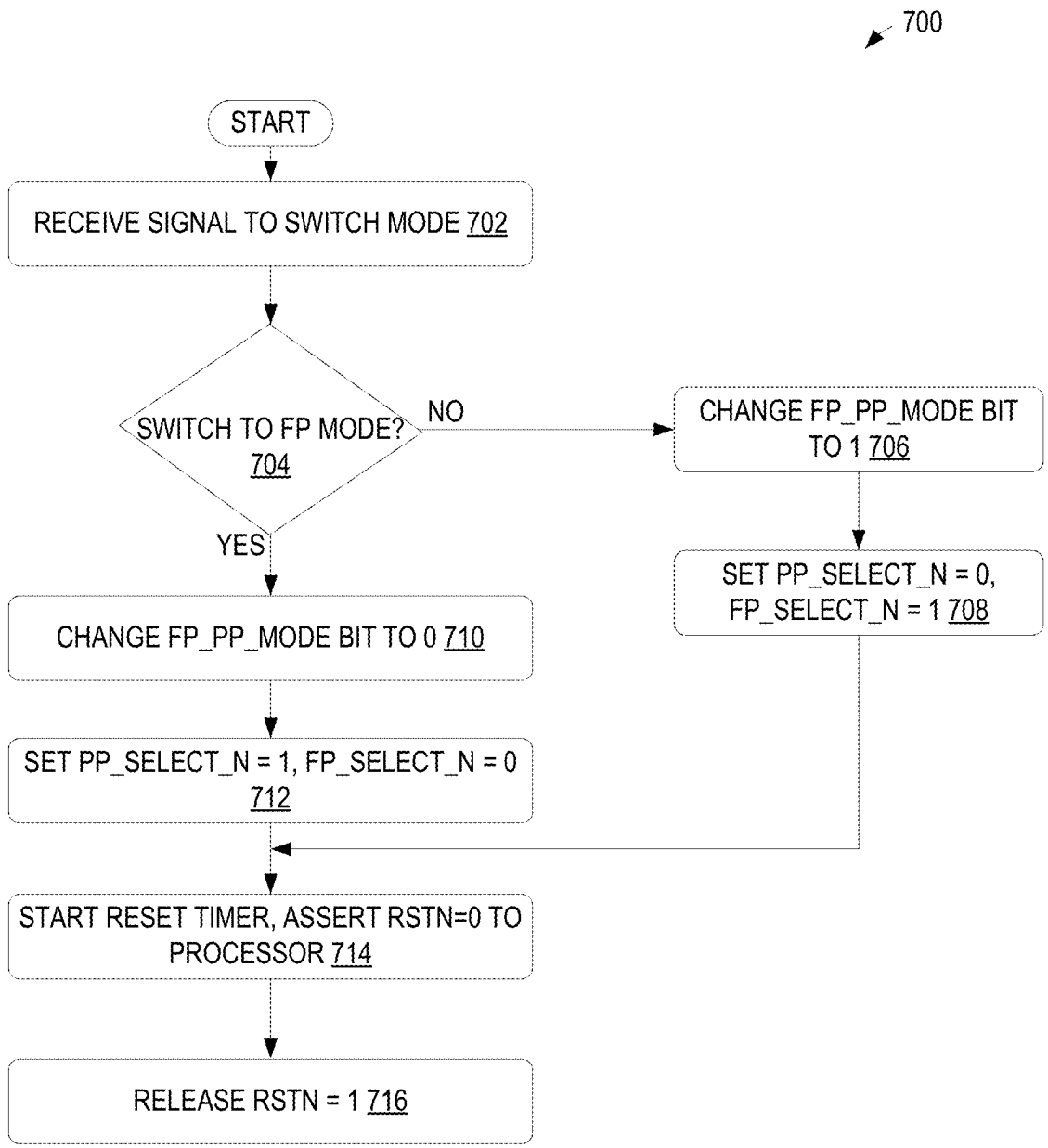
FIG. 7 is a flow chart of an example method for switching between operational modes in a switchable part device, according to one embodiment.

The switching process described above is further illustrated in method 700 of FIG. 7, which can be performed by a switchable part device (e.g., the device including system 600 of FIG. 6), such as base station 110 (when configured as a switchable part) or switchable part 114 of FIG. 1, FP1/PP1 of FIG. 2, the base station of FIG. 3, the portable device of FIG. 4, and/or the mountable device of FIG. 5. At 702, the method includes receiving, at the processor (e.g., processor 606 of FIG. 6; the processor of the switchable device), a signal to switch the mode of the device. For example, the signal can indicate a targeted mode (e.g., identify whether the device is to be switched to fixed part mode or portable part mode). At 704, the method includes determining whether the mode is to be switched to the fixed part mode (e.g., based on the signal received at 702). If the mode is not to be switched to the fixed part mode (e.g., if the signal received at 702 indicates that the mode is to be switched to the portable part mode), the method includes changing the FP_PP_MODE bit (e.g., a mode select bit) to 1 in the FPGA, as indicated at 706, and setting the PP_SELECT_N signal to 0 and the FP_SELECT_N signal to 1 by the switch, as indicated at 708.

If the mode is to be switched to the fixed part mode (e.g., if the signal received at 702 indicates that the mode is to be switched to the fixed part mode; "YES" at 704), the method includes changing the FP_PP_MODE bit to 1 in the FPGA, as indicated at 710, and setting the PP_SELECT_N signal to 1 and the FP_SELECT_N signal to 0 by the switch, as indicated at 712. It is to be understood that in other examples, the bit/signal selects can be reversed, such that the values used in the fixed part mode could be used in the portable part mode, and vice versa. It is to be further understood that if the signal received at 702 indicates that the device is to be operated in a mode in which the device is already operating (e.g., the signal indicates that the device is to be operated in a fixed part mode while the device is already operating in the fixed part mode, or the signal indicates that the device is to be operated in a portable part mode while the device is already operating in the portable part mode), the method ends without performing one or more of operations 704-716 (e.g., returns to wait until another signal to switch operating modes is received). In some examples, the processor can still write a command to "change" the FPGA to a mode in which the device is operating (e.g., the processor can still perform operation 706 or 710 depending on the mode indicated by the signal received at 702), however the subsequent operations may not be performed, as the mode bit in the FPGA memory is not actually changed. In other examples, the processor can perform a check routine (e.g., between operations 702 and 704) to determine if the mode indicated by the signal 702 is different from a mode in which the device is currently operating (e.g., the processor can check the requested mode against a current setting of the mode bit in the FPGA), and, if the requested mode is not different than the current operation mode, the method can end as described above (e.g., without performing one or more of operations 704-716).

At 714, the method includes starting (with the FPGA) a reset timer, and asserting a timer signal RSTN=0 to the processor. At 716, the method includes releasing RSTN=1 by the FPGA. In some examples, the timing (e.g., a threshold time interval) can be set to provide a 40 ms interval between when the RSTN signal is asserted and released (e.g., the RSTN signal can be held low for 40 ms after the FP_PP_MODE bit is changed. It is to be understood that the signal/bit names used herein are exemplary, and any suitable name can be used without departing from the scope of this disclosure.

Figure 8:
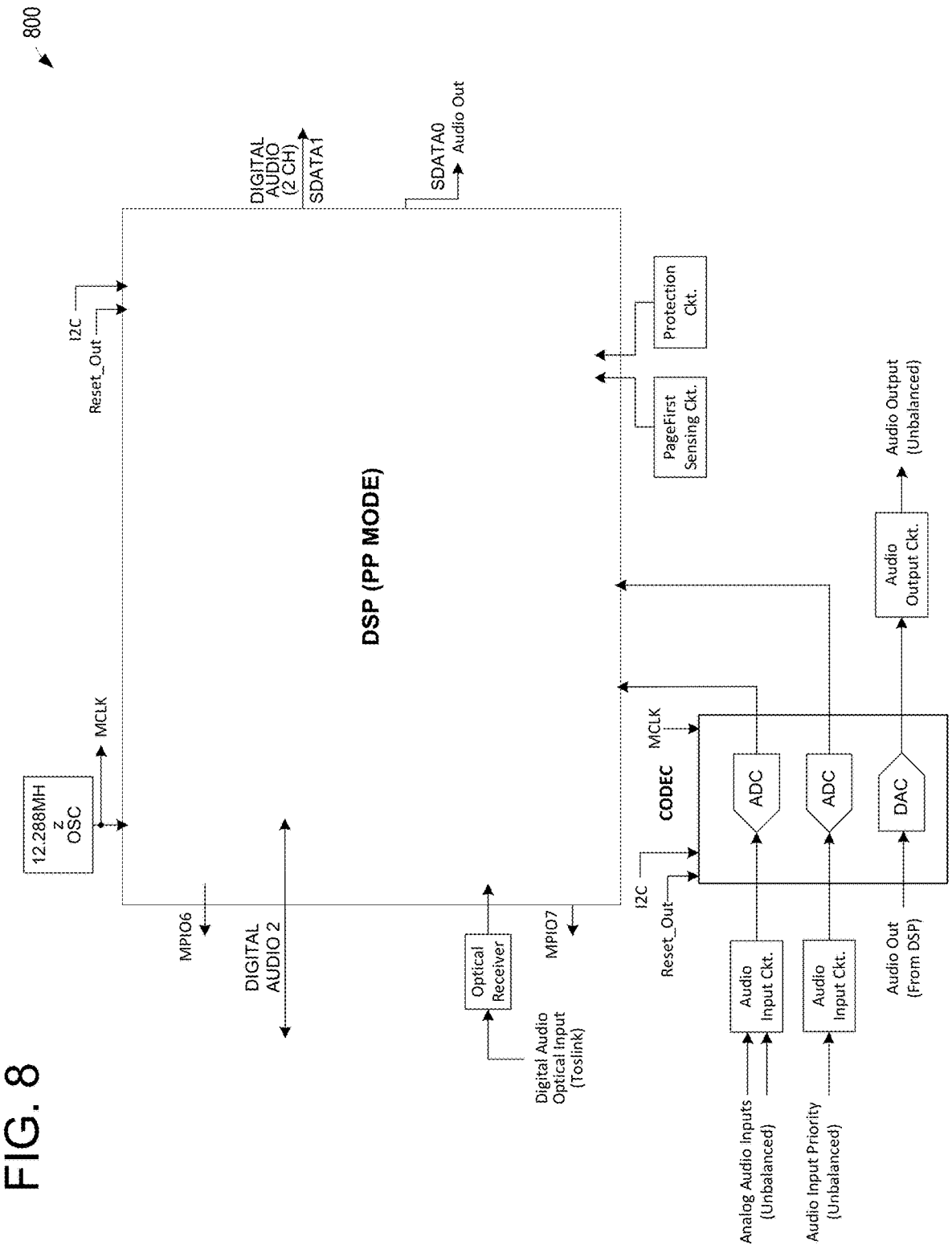
FIG. 8 is a diagram of an example digital signal processor implemented while a switchable part is in a portable part mode, according to one embodiment.
Figure 9:
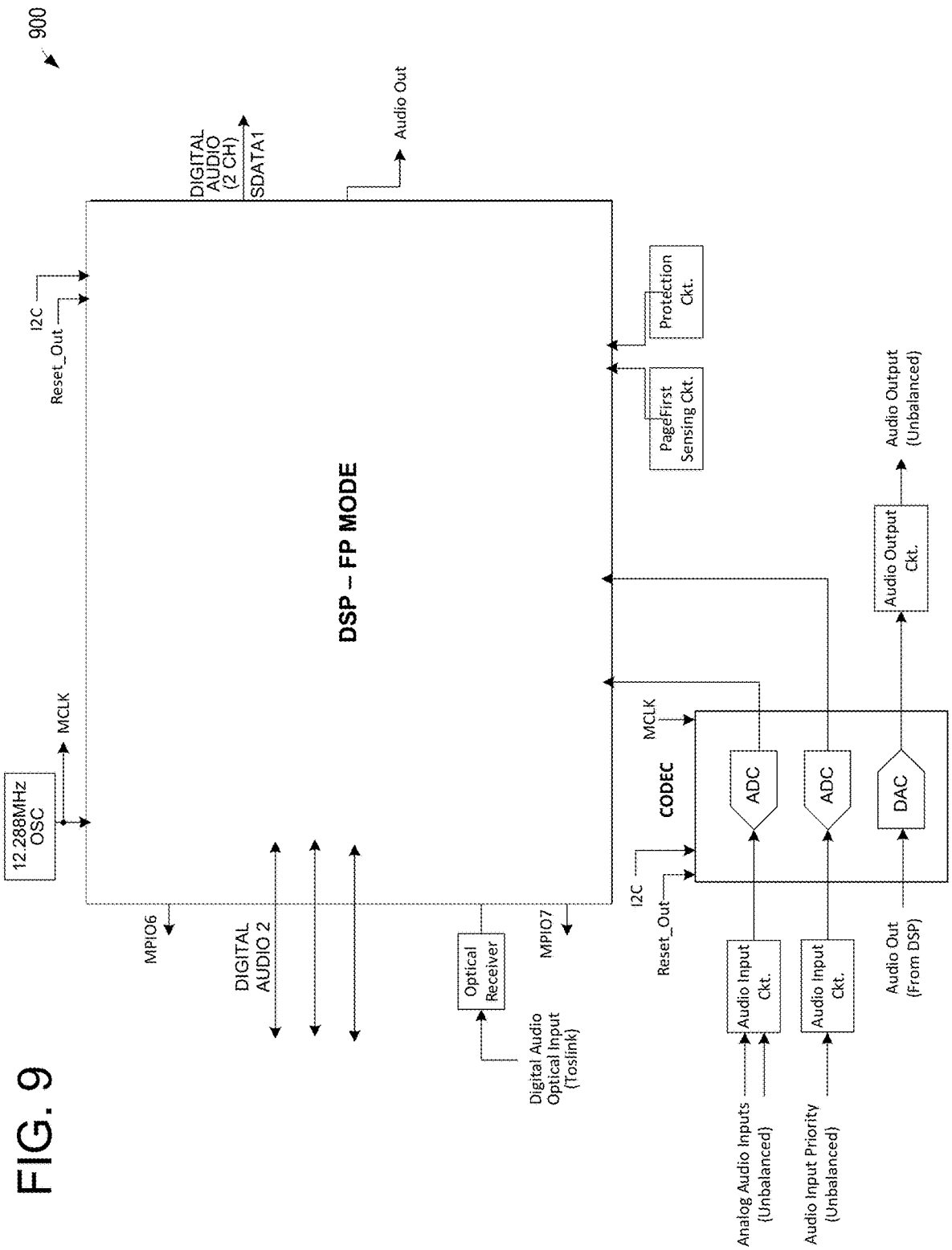
FIG. 9 is a diagram of an example digital signal processor implemented while a switchable part is in a fixed part mode, according to one embodiment.
Figure 14:
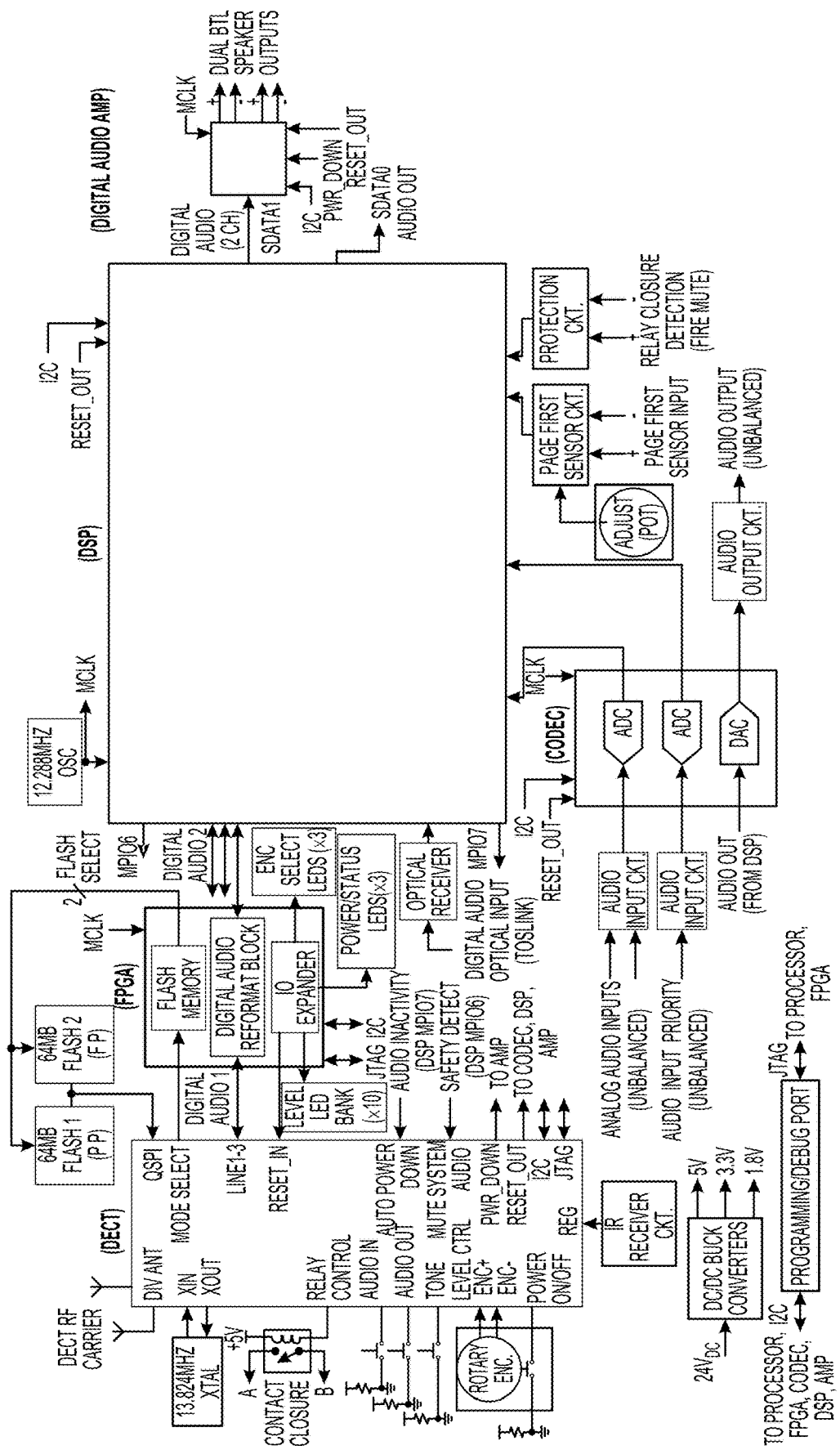
FIG. 14 shows a circuit diagram for an example switchable part device in a fixed part mode.
Figure 15:
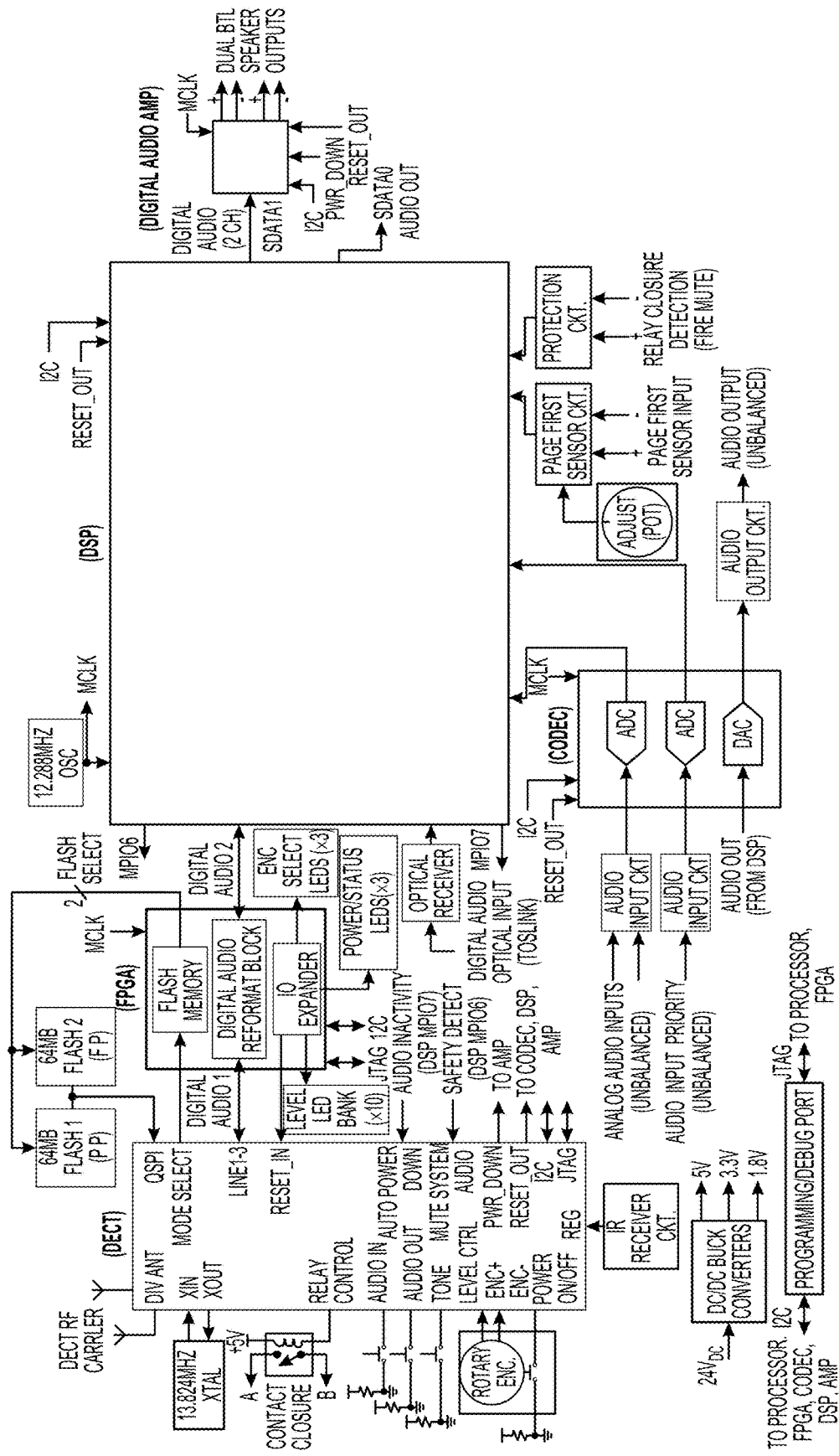
FIG. 15 shows a circuit diagram for an example switchable part device in a portable part mode.

FIGS. 8 and 9 show example digital signal processing (DSP) configurations/connections for the portable part mode and the fixed part modes, respectively, of a switchable device. For example, the configuration 800 of FIG. 8 can reflect the instructions programmed in memory 602 of FIG. 6, while the configuration 900 of FIG. 9 can reflect the instructions programmed in memory 604 of FIG. 6. The DSP of the fixed part mode in FIG. 9 includes additional mixing capabilities to handle the functionality of a fixed part device (e.g., the functionality described above for base station 110 of FIG. 1 and/or any of the other switchable parts in fixed part mode described herein), which services signals from multiple input/output devices (e.g., pods, microphones, etc.). For example, as shown in FIG. 9, the DSP receives multiple incoming audio signals (three signals are shown as an illustrative example, however, the DSP can receive more or fewer audio signals based on how many portable parts are connected to the device operating in fixed part mode), and the DSP can include instructions to mix and process these signals to generate the two channel digital audio output shown. The DSP of the portable part mode in FIG. 8 can be used to provide the functionality of the switchable part 114 (in portable part mode) of FIG. 1 and/or any of the switchable parts in portable part mode described herein. For example, as shown in FIG. 8, the DSP receives a single incoming audio signal (e.g., from a fixed part device and/or a switchable device operating in fixed part mode) and thus may not include the mixing capabilities of the DSP of FIG. 9. FIGS. 14 and 15 show additional examples of DSPs in switchable part devices. For example, FIG. 14 shows a circuit diagram for an example switchable part device 1400 in a fixed part mode, and FIG. 15 shows a circuit diagram for an example switchable part device 1500 in a portable part mode. In some examples, the configuration 800 of FIG. 8 may include a corresponding portion of the circuitry shown in FIG. 14, wherein the configuration 800 may be included in the switchable part device 1400. Additionally or alternatively, the configuration 900 may include a corresponding portion of the circuitry shown in FIG. 15, wherein the configuration of 900 may be included in the switchable part device 1500.

Figure 10:
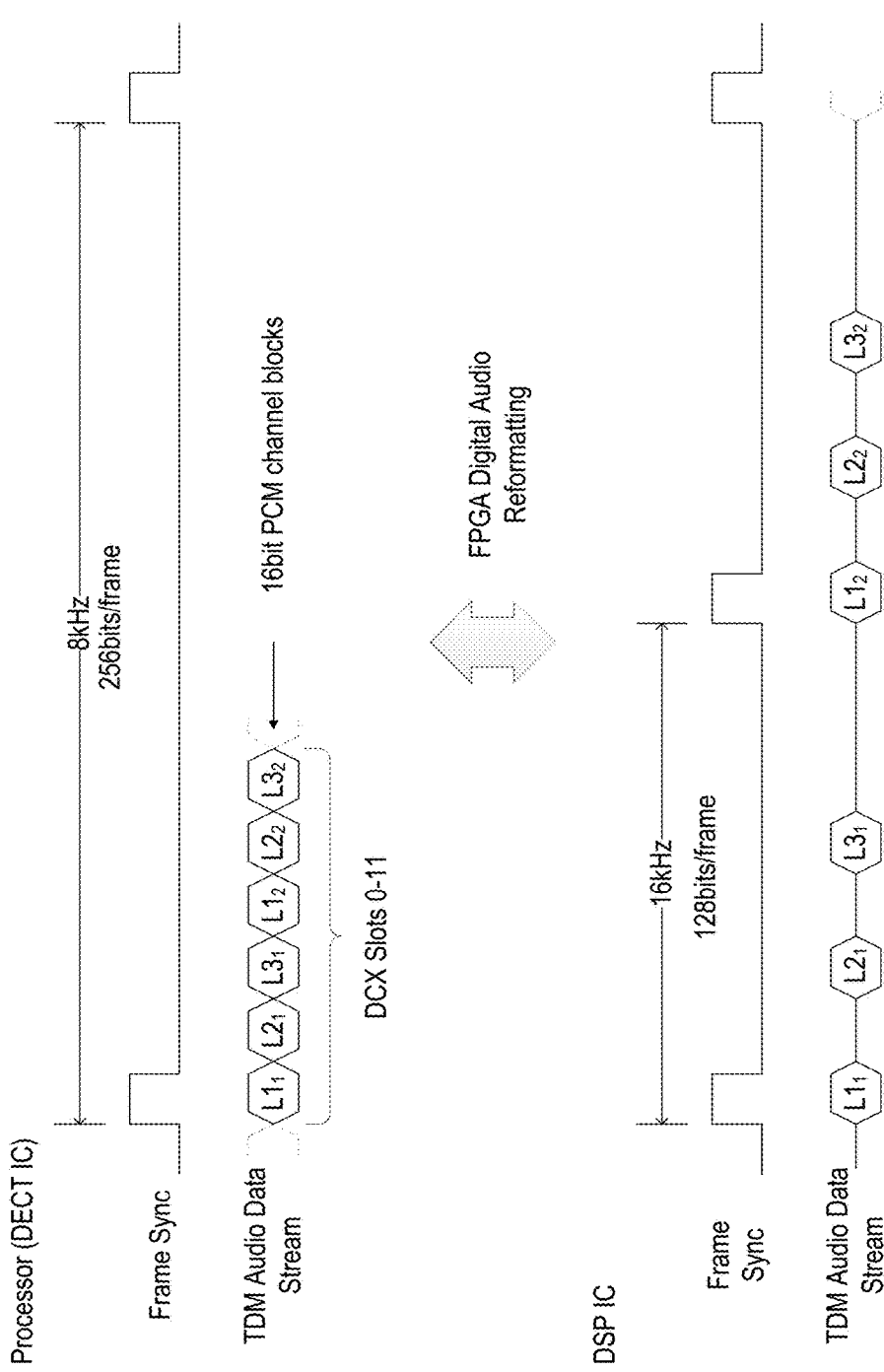
FIG. 10 is an example timing diagram for digital audio reformatting in a field-programmable gate array, according to one embodiment.

As described above with respect to FIG. 6, an FPGA is used to provide mode selection functionality in a switchable part device. The FPGA can also be used for performing digital audio reformatting between the processor and the DSP, and input/output expansion for various control functions and light-emitting diodes (LEDs). For example, the digital audio format supported by the processor (e.g., processor 606 of FIG. 6) may be incompatible with standard I2S multi-channel interfaces, and thus can be reformatted. FIG. 10 shows an example diagram 1000 illustrating how the FPGA reformats audio data as it transits between the processor and the I2S interface.

Figure 11:
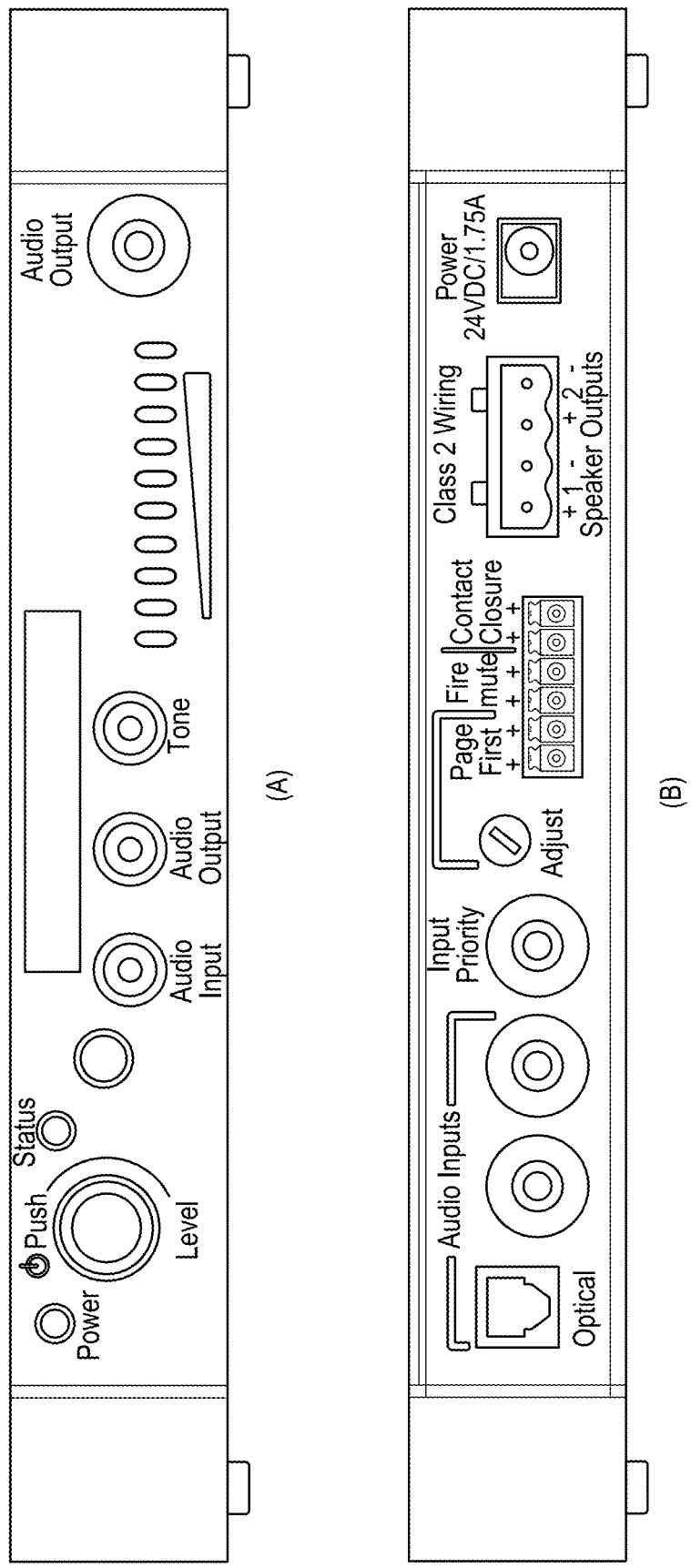
FIG. 11 is an example front and rear view of a switchable part device, according to one embodiment.

FIG. 11 shows a front (A) and rear (B) view of an example device 1100, which can be configured as a switchable part. For example, device 1100 can be used as the base station 110 and/or the portable part 114 of FIG. 1, the FP1 and/or PP1 of FIG. 2, the media connector of FIGS. 3-5. The device 1100 can include the system 600 of FIG. 6 and/or can be programmed to provide the DSP of FIG. 8 when in portable part mode and the DSP of FIG. 9 when in fixed part mode.

As shown, the device 1100 includes input and output components. For example, the front view shows indicator lights for power and status indicators, as well as a volume indicator. The front view also shows push buttons for power, audio input, audio output, and tone switches, as well as an audio output connector. The rear view shows power and audio inputs, as well as speaker outputs and other connectors (e.g., PageFirst, Contact closure, and relay input connectors).

Example One-Button Registration Processes

Figure 16:
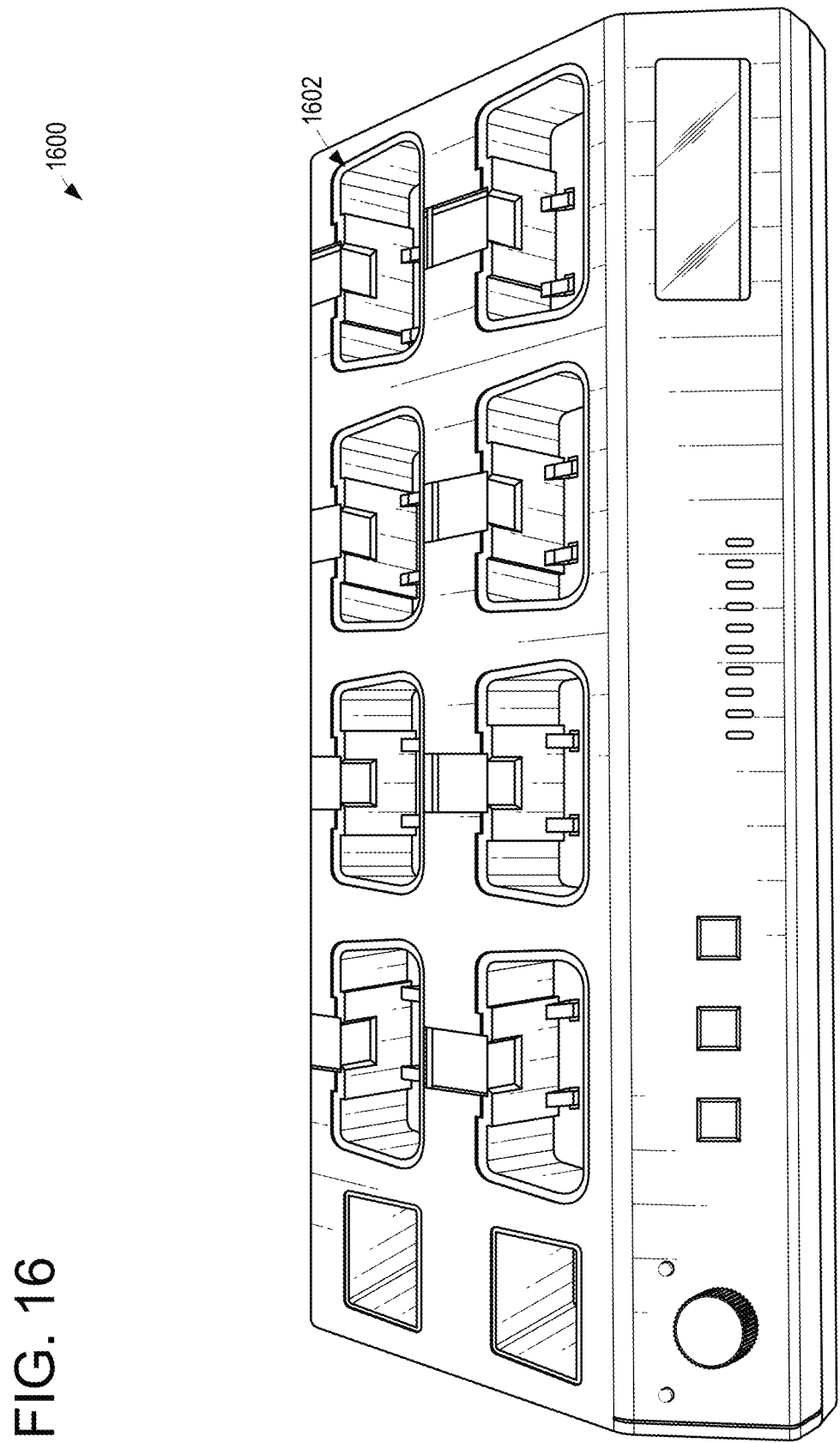
FIG. 16 shows an example charging cradle including charging slots for portable parts of a distributed audio system.

In certain embodiments, in order to introduce a new device into a distributed audio system such as those shown in FIGS. 1-5, a device can be registered or paired with the system. A former method of registration required pushing a button on the fixed part device of the system, then pushing a button on the portable part being registered. The disclosure provides for a one-button registration scheme, in which a command (e.g., a registration signal), which may be transmitted via an infrared, radiofrequency, and/or other signaling mechanism, is used to initiate registration responsive to a single button being pushed on a portable part, such as one of the pods 104, one of the microphones 106, or the switchable part (in portable part mode) 114 of FIG. 1, and/or on a fixed part, such as the base station 110 of FIG. 1 or the switchable parts (in fixed part mode) of FIGS. 2-5. For example, the portable part can include an IR transmitter that sends a command to the fixed part of the audio system (e.g., the base station 110 of FIG. 1), which has an IR receiver. This IR receiver then places the fixed part in registration mode, and the registration of the portable part is commenced and completed, without further intervention from the user. As another example, a method to initiate registration of a portable device such as a pod includes placing the portable device on a charger. For example, FIG. 16 shows an example charging cradle 1600 including charging slots 1602 for portable parts and/or devices of a distributed audio system. When the portable device is placed on the charger, a current is drawn through the charge contacts. A circuit is implemented in the charger to reduce this charge voltage (e.g., from 5.2 V to approximately 4.7 V). This change in voltage is then detected by the charging interface, and triggers a registration operation to commence. This example may be referred to as a cradle charger pulse registration operation.

Figure 12:
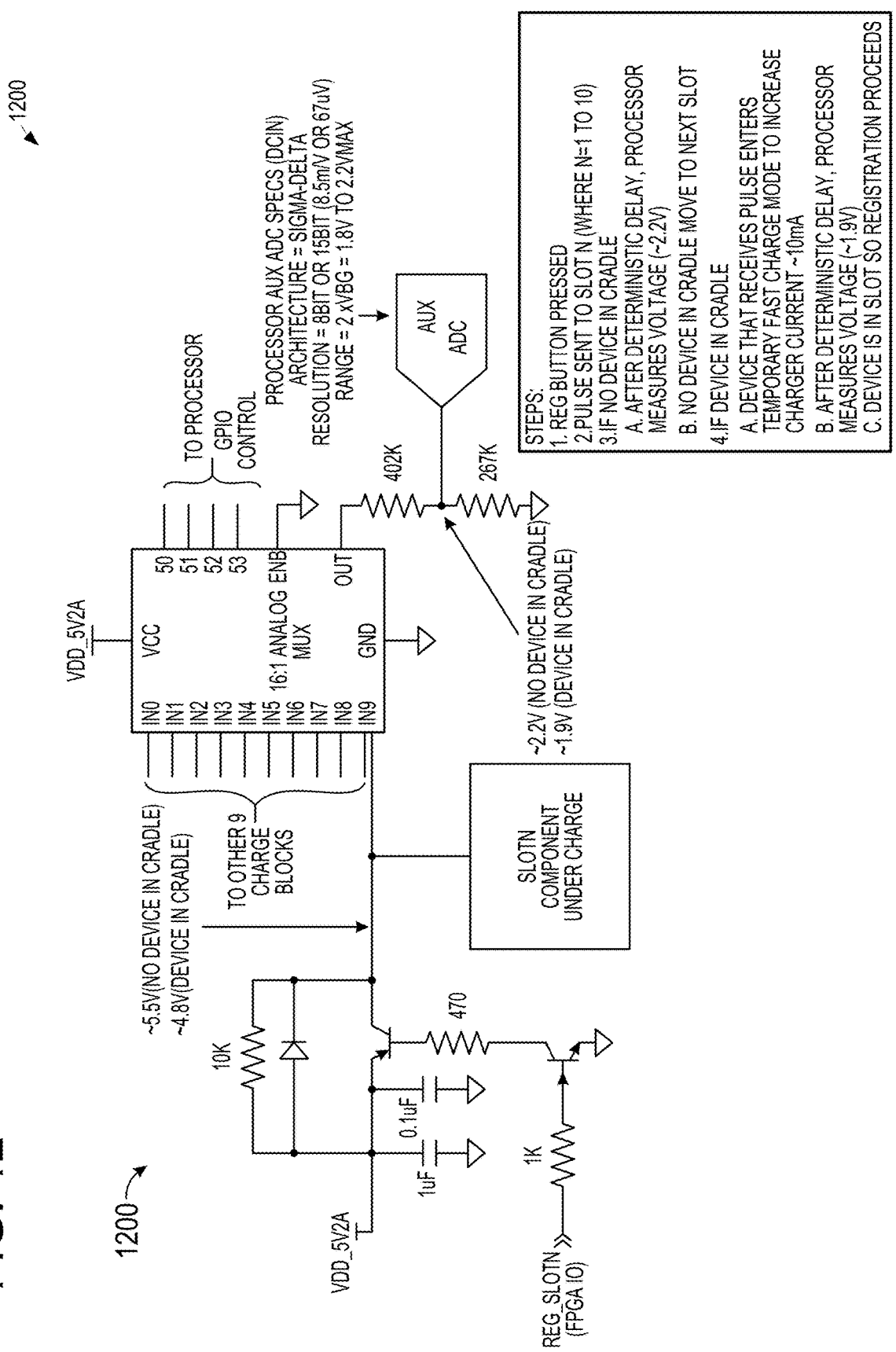
FIG. 12 shows example circuitry for performing a one-button registration operation, according to one embodiment.

Another example of using the cradle charger to initiate registration is a cradle charge detection circuit. A circuit, such as circuit 1200 shown in FIG. 12, can be combined with firmware control to check each charging slot (e.g., 12 slots in some charging devices) to sense if a device is present, and if so, proceeds with registration. A negative pulse can be generated on all the cradle charger slots in a round-robin fashion or manner. For example, the mic slots can be numbered 1 and 2 and the pod slots can be numbered 1-8. The pulse can be initiated by pressing an "Access Pair" button on the fixed part device and each slot will be given a specified amount of time to complete registration/pairing before timing out and moving to the next slot or port. The fixed part also includes circuitry to detect the presence of a device in a charger slot, eliminating the need to wait for pairing to time out.

The fixed part pulse circuitry consists of a rectifier diode in parallel with a PNP transistor. The transistor is normally ON bypassing the diode resulting in nominally 5.5V on the power line. When the transistor is turned OFF to initiate registration/pairing, the voltage will drop to 4.7V, and will be held at this level for approximately 400 ms. The portable part devices seated in a cradle charger will detect the pulse via a GPIO pin on the processor, signaling the device to enter registration mode. The voltage drop across the series diode is used to determine the presence of a device in the cradle slot.

Accordingly, initiating registration on a given slot causes a negative pulse on the charge voltage line when PNP is turned off. If there is no device present the ADC will not detect a drop across the diode and so registration will procced to the next slot. If a device is present the device has a detection circuit that will see the negative pulse and that will put it into registration with the base unit.

As described above, the one-button registration techniques can be used to place a portable part (PP) and a fixed part (FP) into registration mode in order to register the PP to the FP. Once put into registration mode, the PP and FP can exchange their information data in the registration mode. The PP sends an FP register request with the PP's information data including the PP's device ID. When the FP receives the request, the FP will check if there is an empty slot for this PP, if the PP is allowed to be registered to the FP, the FP writes the PP's information and device ID to the FP memory (e.g., memory 604 of FIG. 6). The FP assigns a slot number to the PP, the slot number and the FP's information including the FP's device ID will be sent to the PP. The PP will write FP's device ID and information in PP memory. The registration is completed, the FP keeps the PP's information data in its memory, and the PP keeps the FP's information data in the local PP memory.

In some examples, the base station and/or one or more of the portable parts can be configured to communicate via WIFI in addition to DECT (e.g., in FIG. 1, the base station 110 can be configured to communicate with one or more of the pods 104 via WIFI and to communicate with one or more of the microphones 108 via DECT). Accordingly, the base station can act as a WIFI access point while the WIFI-enabled portable parts (e.g., pods 104) act as stations. The one-button registration techniques described above can also trigger the establishment of a WIFI connection between the portable parts and the base station. For example, for WIFI-enabled devices, the above-described one-button registration techniques (e.g., the IR signal, the presence detection, the pulse, etc.) can be used to trigger a WIFI pairing (e.g., an establishment of a WIFI connection) between the base station and the portable device (e.g., exchanging/storing information to allow the base station and pods to communicate with one another via WIFI). It is to be understood that the above one-button registration processes can additionally or alternatively be performed in order to establish any pairing or connection according to a suitable protocol (e.g., BLUETOOTH, Near-Field Communications, etc.).

Figure 13:
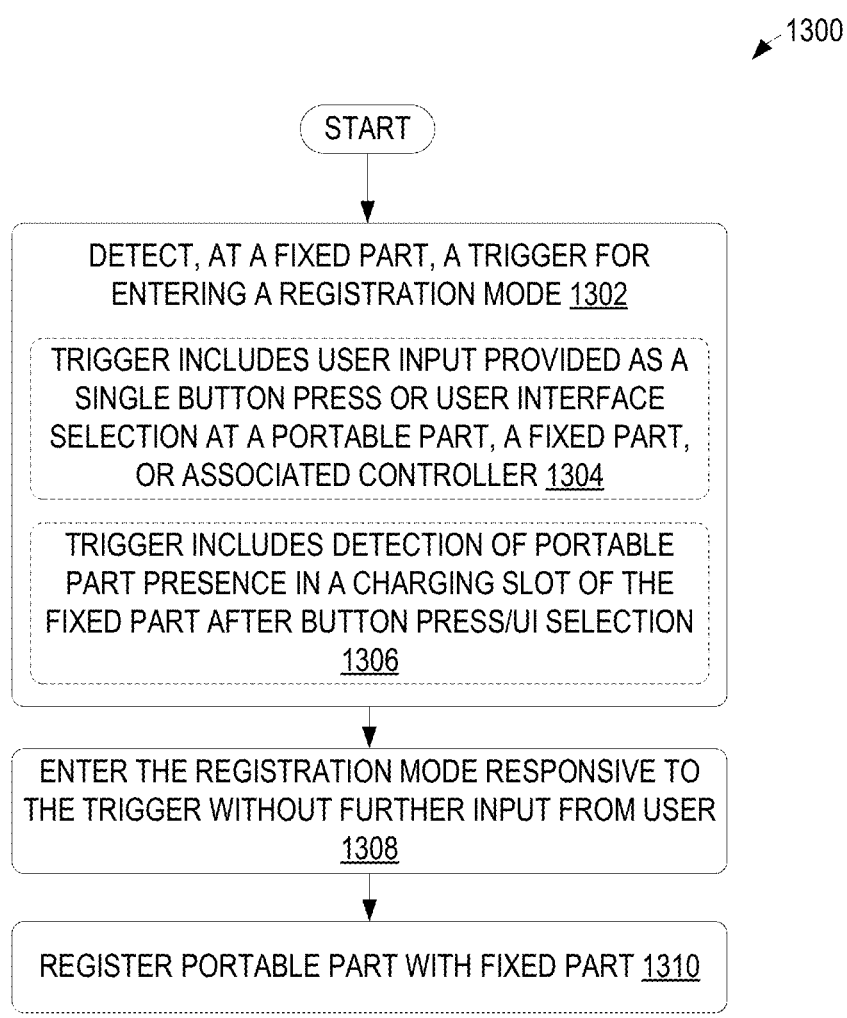
FIG. 13 is a flow chart of an example method for performing a one button registration of a portable part device with a fixed part device, according to one embodiment.

FIG. 13 is a flow chart of an example method 1300 for performing a one button registration of a portable part device with a fixed part device. For example, method 1300 can be performed by a fixed part (or switchable part operating in fixed mode) of an audio system, such as the base station 110 of FIG. 1 and/or any of the switchable parts operating in fixed mode described herein. At 1302, the method includes detecting, at the fixed part, a trigger for entering a registration mode. As indicated at 1304, the trigger can include a user input provided as a single button press or user interface (UI) selection at the portable part being registered, at the fixed part, or at an associated controller (e.g., an IR remote that outputs IR signals detectable by the fixed part). For example, the user can press a button on one of the above-described devices and/or make a comparable user interface selection (e.g., select a menu option on a graphical user interface, etc.).

As indicated at 1306, the trigger can include detection of a presence of the portable part in a charging slot of the fixed part (e.g., after the button press/UI selection). For example, the fixed part can be configured as a charging cradle, and, upon detection of the user input for entering registration mode, the fixed part can detect the presence of the portable part based on current drawn through charge contacts of the charging cradle. In another example, upon detection of the user input for entering registration mode, the fixed part can generate a pulse (e.g., a negative pulse) on all cradle charger slots (e.g., in a round-robin manner or other mechanism) to detect the presence of any portable devices seated in the cradle charger based on responses to the pulse.

At 1308, the method includes entering the registration mode responsive to the trigger without further input from the user. For example, the registration mode can be entered at both the portable part and the fixed part responsive to a single input by the user (e.g., a single button press, UI selection, etc.). At 1310, the method includes registering the portable part with the fixed part (e.g., exchanging and storing data as described above).

ADDITIONAL EXAMPLES

Example Base Station and Pod Descriptions

In accordance with the disclosed examples, a learning space can be configured in which educators have a cloud-based tool for assessment and analytics that rely upon the described hardware and software. The combination of these components provides recording and cloud storage capability.

Example features of the components described herein include over-the-air field upgrades to the firmware, audio recording in base station via the pods, network connection (e.g., WiFi or wired Ethernet) in the base station, mode switching of the 'amplifiers' (Fixed Part< >Portable Part), and one-button registration.

The base station may support charging and operation of the pods and microphones. The base station may be configured as a fixed part instead of a portable part. Commands for control of the system via app on the user's mobile device or computer can be handled via WiFi. The Bluetooth radio can be used for streaming audio and for recording on the mobile device.

The pods may not have a loudspeaker component in some examples. The pods can have a beamforming microphone array to maximize the acoustic signal to noise ratio of individual voices. The pods may capture student speech and provide the captured speech to the base station for use in three separate applications in some examples: recording for upload to the speech analytics engine, teacher monitoring students in real-time, and student sharing to the class speaker. In some examples, the pods may be capable of isolating an individual voice while greatly reducing background noise (other students). The pods may have a buzzer so the teacher can signal the pods.

Over-the-air firmware updates can be performed by downloading an update package to the base station via a network connection and then utilizing the SUOTA system in the DECT firmware to push the updates to the Portable Parts and WiFi to push updates to WiFi-enabled pods.

The base station can support operation of a maximum number of pods (e.g., eight), and can be able to be connected to and control a second base station that supports an additional number of pods.

The microphones can include an infrared transmitter to enable the user to trigger one-button registration. A sensing circuit can be included in the charging contacts for detection of a registration trigger signal from the base station. An example summary of functions and features for an example base station may include one or more of the following: a) Cradle charging slots for eight Pods, and two self-cleaning slots for microphones (charging and storage). The base station may include a snap-in insert for the Pod charging slots to accommodate pods of different sizes/configurations; b) Covers for unused Pod cradle slots; c) One dual mono Audio output jack and one stereo (summed to mono) Audio input jack (3.5 mm); d) Optical S/PDIF (Toslink) digital audio input (stereo summed to mono); e) DECT Base "FP" device—may not be switchable; f) POD WIFI audio is transferred over Wifi to base station. The POD WIFI may not have DECT; g) One Bluetooth audio for streaming and recording with mobile device for "moment" recording. Moment recording is recording from microphone and any selected Pod; h) System control using smart device or computer via WiFi or with microphone via DECT; i) Software updates over the air (SUOTA); j) Registration trigger source for pods and microphones via power line pulse through 5V cradle contacts. This is initiated with a single button press on the base station. In some example implementations, registration is only triggered if products are in cradle slots; k) Compatible with pods; l) Wired Ethernet interface (RJ-45); m) Fully software compatible with all Access v6.x platform devices; n) Provides capability to monitor pods with microphone earbud; o) Provides capability to connect pods to classroom speaker for Pod to Class audio; p) Provides capability to transfer audio from pods to the cloud for transcription and analysis; q) Diagnostics and usage statistics may be available by logging into base station from remote location; r) BT audio may incorporate MCX fixes; s) USB-A jack for interfacing with a customer's existing devices—provides power and audio.

Example controls for base station may include one or more of the following: a) DECT Registration button (no tool needed) on the back—labeled "Access Pair;" b) Bluetooth Pairing button (no tool needed) on the back—labeled "BT Pair;" c) Mobile Device/Laptop WiFi Pairing button (no tool needed) on front—labeled "TBD;" d) Power/Standby button on front panel labeled "Power".

Example indicators for base station may include one or more of the following: a) Power light. Example configurations: i) Blue when power is "on;," ii) Yellow when power is in "Standby" mode, iii) Dark when power is "off" (e.g., power supply disconnected); b) Network status light to indicate internet connection is present; c) Mobile Device Pairing Light to blink when activated in "discoverable" mode. Located on front next to "TBD" button in some examples; d) Bluetooth Pairing light. Example configurations: i) Flashing blue/off when pairing is in process, ii) Dark when not pairing; e) RJ45 Ethernet Jack may have an indicator that indicates connection and activity.

Example connections for base station may include one or more of the following: a) Two charging slots for any combination of 2 microphones (2 pin proprietary charging contacts); b) Eight charging slots for newer pods (2 pin proprietary charging contacts) snap-in adapters may be used for older pods; c) Rear Panel: i) One 3.5 mm TRS audio jack for audio in—Stereo summed to mono, ii) One optical S/PDIF (Toslink) input—Stereo summed to mono, iii) One 3.5 mm TRS jack for audio out—Dual mono, iv) RJ45 jack for wired Ethernet, v) DC barrel connector for the 24VDC/2.5A power supply; d) Multipin connector on bottom for test and development (covered); e) SD Card slot for factory programming for the Linux OS; f) USB-A jack to interface with existing microphone classroom audio systems.

Example features and functions for pods may include one or more of the following: a) WiFi transceiver for audio data and control commands; b) Microphone array for beamforming and noise reduction; c) Table top usage model, may include rubber feet similar to Pod; d) Teacher Call function with local Cancel capability; e) Buzzer so that teacher can notify POD.

Example controls for pods may include one or more of the following: a) Power button on side or bottom—flush with raised edge to prevent accidental operation; b) Teacher Call button on top.

Example indicators for pods may include one or more of the following: a) Status light to indicate power, low battery, and charging status—RGB LED; b) Single-digit white 7-segment LED display for assigned pod number and teacher call indicator (teacher call is flashing number). Presence of Pod number indicates connection to base station and Sync/Link. If Pod is unregistered, number will be "0".

Example connections for pods may include one or more of the following: a) 2-pin proprietary charging contacts, compatible with base station pod charging slots; b) 2-pin header connector for battery inside battery compartment; c) Multipin programming connector inside battery compartment.

Example One-Button Registration of DECT Components

In the case of a basic classroom audio system, the microphones can include an out-of-channel wireless "trigger" (infrared transmitter/receiver) to make it possible to start the registration process without physically touching the fixed part (e.g., base station). Once the trigger has been initiated it may cause the fixed part (FP) to enter registration mode. If the mic that invokes the trigger is not registered and linked to the FP, the mic may enter registration mode as well. If the mic IS registered and linked to the FP, it is assumed that the device to be registered is an MCA, and the registration button on the MCA may be actuated to register the device (e.g., the user may be prompted to press the registration button on the MCA to register it).

In the case of a system that includes a cradle charging base station, the registration of the portable part (PP) devices may be handled by placing them in the appropriate charging slots and pressing a button on the base station to initiate the registration process. Each PP may be registered by the base station automatically, using trigger signals on the charging contacts.

Example features and functions of a switchable part may include one or more of the following: a) Two channel amplifier system: i) DSP processing, ii) 2-channel Class D amplifier; b) PageFirst function mutes audio when activity is detected on the school paging system; c) Table top or wall mounted; d) Complies with UL/CUL, CE, RoHS, WEEE, and FCC/IC requirements; e) Wireless connectivity to the base station for audio and system-control; f) Automatic power down after two hours of inactivity; g) Local or remote (via base station) control for system ON/OFF; h) Local or remote (via base station) volume controls for audio inputs; i) Local or remote (via base station) volume controls for audio (ALD) output; j) Local or remote (via base station) tone control; k) DECT "Mode Switching" between fixed part (FP) and portable part (PP)—i) Operates as FP in a first generation base station, or standalone, ii) Operates as PP when paired with another FP device including base station, iii) Sync LED color indicates operating mode; 1) Mode switching triggered by DECT commands from base station; m) Registration triggered by infrared (IR) commands received by integrated IR photodiode; n) Support software updates over the air (SUOTA) via DECT channel with processor; o) Digital volume and tone controls with and LED bar graph indicator; p) Optical S/PDIF (Toslink) digital audio input; q) Audible confirmation when registration is complete or if registration fails; r) Relay closure sensing in addition to PageFirst to mute audio when a signal from the fire alarm system is detected. (programmable NO/NC); s) Relay contact closure to provide a signal that 'alerts' an external system based on user input (panic button).

Example controls of switchable part device may include one or more of the following: a) Registration button (recessed) on rear panel—labeled "Access Pairing;" b) Digital controls on front panel may include a single rotary encoder with push buttons to select parameter to be adjusted, such as: i) Audio in volume, ii) Audio out volume, iii) Tone (bass/treble); c) The rotary encoder may include a pushbutton switch that may act as the power on/off switch; d) Infrared receiver to detect registration commands from microphones and/or pods.

Example indicators of switchable part device may include one or more of the following: a) Power light on front panel; b) Sync light on front panel (Labeled "Status"); c) Level Indicator on front panel, example configurations may include one or more of the following: i) 10 LED bar graph indicator that shows the level of the currently selected audio parameter, ii) LED color may be white, iii) Displays level for 5 seconds, then goes dark until the next user input; d) Selected Audio Parameter indicators, example configurations may include one or more of the following: i) Audio parameter selection buttons have an integrated white LED to indicate when each is selected, ii) Parameter selection button LEDs are mutually exclusive, iii) Last selected parameter button LED remains lighted indefinitely, iv) After power cycle, last selected parameter button LED is lit, v) After the 5 second timeout (when the volume LEDs have gone dark), user input may light the volume LEDs again e.g., by touching the rotary encoder or pressing any parameter adjust button.

Example connections of the switchable part device may include one or more of the following: a) One 3.5 mm TRS audio jack for audio out—dual mono (front panel); b) Three 3.5 mm TRS audio jacks for audio in—stereo summed to mono (rear panel); c) One optical S/PDIF (Toslink) input (rear panel); d) Barrel connector for the DC power supply (rear panel); e) 4 pin Euroblock connector (5 mm pitch) for speaker outputs 1 & 2 (no retention screws); f) 6 (or 4 without contact closure) pin Euroblock connector (3.5 mm pitch) for control signals (no retention screws)—i) Pin 1—PageFirst sensor positive, ii) Pin 2—PageFirst sensor negative, iii) Pin 3—contact closure sense positive—mutes audio when external system shorts or removes a short (NC/NO), iv) Pin 4—contact closure sense negative—mutes audio when external system shorts or removes a short (NC/NO), v) Pin 5—relay contact closure for external systems—NO (normally open), vi) Pin 6—relay contact closure for external systems—COM (common).

Example features and functions of a switchable part media connector device may include one or more of the following: a) DECT "portal" that provides a path to add Access technology to any classroom amplification system; b) Table top or wall mounted; c) Complies with UL/CUL, CE, RoHS, WEEE, and FCC/IC requirements; d) Wireless connectivity to the base station for audio and system-control; e) Automatic power down after two hours of inactivity; f) Local or remote (via base station) control for system ON/OFF; g) Local or remote (via base station) volume controls for audio inputs; h) Local or remote (via base station) tone control; i) DECT "Mode Switching" between FP and PP—i) Operates as FP in a first generation Activate System, with a base station, or standalone, ii) Operates as PP when paired with another FP device including base station, iii) Sync LED color indicates operating mode; j) Mode switching triggered by DECT commands from base station or from microphones via IR with a special button press sequence; k) Registration triggered by infrared (IR) commands received by integrated IR photodiode from microphones; l) Support software updates over the air (SUOTA) via DECT channel with processor; m) Digital volume and tone controls with and LED bar graph indicator; n) Optical S/PDIF (Toslink) digital audio input; o) Audible confirmation when registration is complete or if registration fails; p) USB Type-C connector for power, data, and audio (replaces mini USB connector).

Example controls of switchable part media connector device may include one or more of the following: a) Registration button (recessed) on rear panel—labeled "Access Pairing;" b) Digital controls on front panel may include a single rotary encoder with push buttons to select parameter to be adjusted, such as: i) Audio in volume, ii) Audio out volume, iii) Tone (bass/treble); c) The rotary encoder will include a pushbutton switch that may act as the power on/off switch; d) Infrared receiver to detect registration and mode switching commands from microphones; e) MIC/LINE switch to drop audio out level by 40 dB for mic level inputs.

Example connections of switchable part media connector device may include one or more of the following: a) One 3.5 mm TRS audio jack for audio out—dual mono (rear panel); b) One 3.5 mm TRS audio jack for audio in—stereo summed to mono (rear panel); c) One optical S/PDIF (Toslink) input (rear panel); d) 3 pin Euroblock connector (3.5 mm pitch) for balanced audio out (rear panel) (no retention screws); e) USB Type-C connector for the DC power supply (rear panel).

Example Pinout and Pin Description

TABLE 1

Example pinout and pin descriptions for an example distributed audio component.

| Name | Direction | Location | I/O Standard | Comment | Description |
| --- | --- | --- | --- | --- | --- |
| aud_in_led_g gpio[15] | Output | PIN_68 | 3.3-V LVTTL | | LED port |
| aud_out_led_g gpio[16] | Output | PIN_67 | 3.3-V LVTTL | | LED port |
| clock_in | Input | PIN_27 | 3.3-V LVTTL | | Global clock input |
| clock_in2 | Input | PIN_26 | 3.3-V LVTTL | | Not used in this design |
| conf_done | Output | PIN_135 | 3.3-V LVTTL | | Flag to indicate FPGA configuration done |
| config | Input | PIN_122 | 3.3-V LVTTL | | Enable configuration of FPGA |
| dcx_bclk | Input | PIN_39 | 3.3-V LVTTL | 8 ma | Bit Clock from processor |
| dcx_fsync | Input | PIN_40 | 3.3-V LVTTL | 8 ma | Frame sync from processor |
| dcx_rstn | Output | PIN_48 | 3.3-V LVTTL | Open drain | Resets processor, used after mode switch |
| dcx_rstn2 | Output | PIN_49 | 3.3-V LVTTL | | Not used |
| dsp_bclk | Output | PIN_50 | 3.3-V LVTTL | | Bit clock to DSP |
| dsp_fsync | Output | PIN_47 | 3.3-V LVTTL | | Frame sync to DSP |
| fp_select_n | Output | PIN_65 | 3.3-V LVTTL | | Select external FP mode memory |
| fpmode_n | Input | PIN_69 | 3.3-V LVTTL | | Force FP mode for processor programming |
| gpio_reg[13] | Output | PIN_138 | 3.3-V LVTTL | | GPIO port gpio_reg |
| gpio_reg[12] | Output | PIN_137 | 3.3-V LVTTL | | GPIO port gpio_reg |
| gpio_reg[11] | Output | PIN_134 | 3.3-V LVTTL | | GPIO port gpio_reg |
| gpio_reg[10] | Output | PIN_129 | 3.3-V LVTTL | | GPIO port gpio_reg |
| gpio_reg[9] | Output | PIN_127 | 3.3-V LVTTL | | GPIO port gpio_reg |
| gpio_reg[8] | Output | PIN_128 | 3.3-V LVTTL | | GPIO port gpio_reg |
| gpio_reg[7] | Output | PIN_125 | 3.3-V LVTTL | | GPIO port gpio_reg |
| gpio_reg[6] | Output | PIN_126 | 3.3-V LVTTL | | GPIO port gpio_reg |
| gpio_reg[5] | Output | PIN_123 | 3.3-V LVTTL | | GPIO port gpio_reg |

TABLE 1-continued

Example pinout and pin descriptions for an example distributed audio component.

| Name | Direction | Location | I/O Standard | Comment | Description |
|---|---|---|---|---|---|
| gpio_reg[4] | Output | PIN_124 | 3.3-V LVTTL | | GPIO port gpio_reg |
| gpio_reg[3] | Output | PIN_116 | 3.3-V LVTTL | | GPIO port gpio_reg |
| gpio_reg[2] | Output | PIN_114 | 3.3-V LVTTL | | GPIO port gpio_reg |
| gpio_reg[1] | Output | PIN_117 | 3.3-V LVTTL | | GPIO port gpio_reg |
| gpio_reg[0] | Output | PIN_112 | 3.3-V LVTTL | | GPIO port gpio_reg |
| i2cclk | Bidir | PIN_55 | 3.3-V LVTTL | | I2C port |
| i2cdat | Bidir | PIN_54 | 3.3-V LVTTL | | I2C port |
| led1 gpio[0] | Output | PIN_106 | 3.3-V LVTTL | 8 ma | Volume LED outputs |
| led2 gpio[1] | Output | PIN_105 | 3.3-V LVTTL | 8 ma | Volume LED outputs |
| led3 gpio[2] | Output | PIN_103 | 3.3-V LVTTL | 8 ma | Volume LED outputs |
| led4 gpio[3] | Output | PIN_101 | 3.3-V LVTTL | 8 ma | Volume LED outputs |
| led5 gpio[4] | Output | PIN_100 | 3.3-V LVTTL | 8 ma | Volume LED outputs |
| led6 gpio[5] | Output | PIN_99 | 3.3-V LVTTL | 8 ma | Volume LED outputs |
| led7 gpio[6] | Output | PIN_98 | 3.3-V LVTTL | 8 ma | Volume LED outputs |
| led8 gpio[7] | Output | PIN_97 | 3.3-V LVTTL | 8 ma | Volume LED outputs |
| led9 gpio[8] | Output | PIN_95 | 3.3-V LVTTL | 8 ma | Volume LED outputs |
| led10 gpio[9] | Output | PIN_94 | 3.3-V LVTTL | 8 ma | Volume LED outputs |
| link_led_b gpio[12] | Output | PIN_63 | 3.3-V LVTTL | 8 ma | Link LED outputs |
| link_led_g gpio[11] | Output | PIN_61 | 3.3-V LVTTL | 8 ma | Link LED outputs |
| link_led_r gpio[10] | Output | PIN_60 | 3.3-V LVTTL | 8 ma | Link LED outputs |
| power_led_b gpio[13] | Output | PIN_59 | 3.3-V LVTTL | 8 ma | Power LED outputs |
| power_led_r gpio[14] | Output | PIN_53 | 3.3-V LVTTL | 8 ma | Power LED outputs |
| pp_select_n gpio[9] | Output | PIN_70 | 3.3-V LVTTL | | Select external PP mode memory |
| reset_n | Input | PIN_88 | 3.3 V Schmitt Trigger | | Reset all modules except mode switching instances |
| reset_n_2 | Input | PIN_141 | 3.3 V Schmitt Trigger | | Not used |
| sd_dcx_fpga | Input | PIN_42 | 3.3-V LVTTL | | Serial audio data from processor to FPGA |
| sd_dsp_fpga | Input | PIN_44 | 3.3-V LVTTL | | Serial audio data from DSP to FPGA |
| sd_fpga_dcx | Output | PIN_41 | 3.3-V LVTTL | | Serial audio data from FPGA to processor |
| sd_fpga_dsp | Output | PIN_46 | 3.3-V LVTTL | | Serial audio data from FPGA to DSP |
| speaker_led_g gpio[17] | Output | PIN_52 | 3.3-V LVTTL | | LED port |
| tone_led_g gpio[18] | Output | PIN_51 | 3.3-V LVTTL | | LED port |
| jtagen | Input | PIN_13 | 3.3-V LVTTL | | JTAG port for FPGA programming |
| tck | Input | PIN_16 | 3.3-V LVTTL | | JTAG port for FPGA programming |
| tdi | Input | PIN_17 | 3.3-V LVTTL | | JTAG port for FPGA programming |
| tdo | Output | PIN_18 | 3.3-V LVTTL | | JTAG port for FPGA programming |
| tms | Input | PIN_15 | 3.3-V LVTTL | | JTAG port for FPGA programming |
| | Output | PIN_32 | 3.3-V LVTTL | | PLL clock output not used |
| | Input | PIN_31 | 3.3-V LVTTL | | Global clock input not used |

Notes for Table 1:
1) Current strength is 4 ma unless otherwise noted.
2) VCC and Ground not shown.

Example Register Definitions
  Example I2C base address: 0x58
  Example I2C Subaddresses:
GPIO[23:0]:
  I2C sub address=0x00 used for LED control, can be used as general purpose GPIO.
  Reset value=0x0783FF. Used for LED drivers on base station
GPIO_REG[13:0]:
  I2C sub address=0x20 used for initiating registration in base station, can be used as general purpose GPIO.
  Reset value=0x0000, Used to generate registration pulse on base station
FP_PP_SWITCH:
  I2C subaddress=0x10 used to switch from FP to PP or PP to FP Reset value=0x00. Write a value of 1 to this register to switch from FP to PP. Write a value of 0 to this register to switch from PP to FP.

Example Non-volatile memory registers:
  These are defined in the User Flash Memory Megafunction user guide for the Intel 10M02 FPGA.
  UFM_STATUS 0x40000
  UFM_CTRL 0x40004
  UFM_DATA 0x20000 to 0x22FFF
Additional Registration Description
Device Registration Example
  This scheme is based upon an electronic pulse being sent to each cradle slot, in order, and allowing sufficient time for the registration operation(s). These pulses are initiated from a back-panel button press, and as so, are totally asynchronous to normal operation of the audio system. Normal operation of the POD-WIFI device network may be mutually exclusive with normal system operation.
  In some example configurations, the device may just honor the button press. In additional or alternative example configurations, the device may hold off for selected cases (for example, session recording in progress). In one non-limiting example, for each registration pulse sent to a cradled POD-WIFI, there are only 2 devices, the base station and the POD-WIFI that know they are trying to connect with each other. This may be leveraged similarly to a WPS button press.

From the factory, base station and POD-WIFI may have an agreed upon default base station with SSID "ACT", WPA2 security, and passphrase (e.g., an alphanumeric string). Each base station may also be assigned a "real" (unique) SSID of the form ACT_<unique number>. Each POD-WIFI device may also be identifiable by a unique number at WiFi connection time. The base station may maintain a database of all currently registered POD-WIFI devices.

Regarding how long it takes to connect or timeout from a POD-WIFI registration attempt, the following table assumes the first 2 of 8 POD-WIFI devices are cradled in the base station. The processor of the base station is responsible for creating these registration pulses, and may inform the system-on-chip (SoC) of the base station each time the processor sends a pulse (in order) to POD slots 1—8, and then to the microphones. The processor may also tell the SoC of the base station about the Registration button press before beginning to pulse cradle slots. Time flows downward in the following table.

existing Pod #2 was present during the above registration scenario, the newly registered pod in slot #2 may take over the pod #2 role. The previous pod #2 may be deregistered. Any pods not in charger but not colliding with new pod number assignments may retain their previous pod number.

The base station may keep a non-volatile table of all currently registered POD-WIFIs. POD-WIFI devices may also store the pod number in non-volatile memory.

Once the base station enters registration mode, and changes its SSID to "ACT", all currently connected POD-WIFIs may be forced to disconnect. All previously connected POD-WIFIs, whether in the charger or not, may immediately begin looking for the real SSID of the base station to which they were connected. POD-WIFIs may continue to try to connect to the real SSID for at least a threshold number of seconds.

Only when a POD-WIFI receives a registration may it begin searching for the default SSID of "ACT". The base station can reduce its 5 GHz WiFi transmit power during the registration process to avoid interference with other base station units that might overlap registration periods.

As described above, the processor on the base station may control the physical sequence of pulses sent to cradled devices. When a particular slot is pulsed, the processor may send the SoC a Set Pod Number command with the corresponding pod number.

TABLE 2

Example timeline of operations in devices of a distributed audio system.

| event | SSID | base station | Pod in Slot #1 | Pod in Slot #2 |
|---|---|---|---|---|
| Reg button | ACT12345 | change SSID to "ACT" | | |
| | ACT | | | |
| | | pulse slot #1 | | |
| | | | Connect to "ACT" | |
| | | tell newly connected pod "ACT_12345" credentials (or timeout) | | |
| | | pulse slot #2 | | |
| | | | | Connect to "ACT" |
| | | tell newly connected pod "ACT_12345" credentials (or timeout) | | |
| | | . . . | | |
| | | pulse slot #8 (timeout) | | |
| | | pulse FM slot #1 (timeout) | | |
| | | pulse FM slot #2 (timeout) | | |
| | | change SSID to "ACT_12345" | | |
| | ACT12345 | | | |
| | | | Connect to "ACT_12345" | Connect to "ACT_12345" |

Pod numbers are assigned by the slot they are in during registration. If another pod is already using that number, it may be "deregistered". This may be done is a manner such that no more than 8 pods are connected at once.

When the real SSID begins broadcasting, all pods (newly registered as well as those already connected to this base station) may begin trying to connect. For each connection, the POD-WIFI provides the base station its unique identifier through which the base station can clean-up the current set of pods into a sane set of numbers. For example, if an Encryption of passphrases, real SSIDs, etc. is already done via the WPA2 security.

The base station provides a DHCP server to assign IP addresses to POD-WIFIs. The base station is always at IP address ".1" in the same subnet in some examples. The subnet is different than the IP addresses assigned on the 2.4 GHz and hardwired ethernet. Each base station 5 GHz network stands alone. The IP address space (subnets, etc.) are specified along with 5 GHz channel assignment via the school IT admin interface to the LST Cloud in some examples.
Port Numbers The POD-WIFIs speak to the base station on sockets (e.g., IP address plus port number). For real-time audio connections, the port number may be based on their currently assigned Pod Number. The base station expects each of up to 8 POD-WIFIs to send real-time audio data to one port and status notifications to another. The POD-WIFI may listen for new commands on a singular, specific port number.

Port base=x
    For example, x=5000
RTP ports=x+((pod #-1)*2)
RTCP ports=RTP port [pod #]+1
    For example, ports 5000 & 5001 are RTP and RTCP ports, respectively, for pod #1

Pods can connect to a single standard port (port 5900 is the base station service) to establish the command and status channels. Upon connecting, a temporary port may be assigned to the TCP connection so other pods can connect to the standard port. This is a standard procedure, used by web servers, FTP, and many others. This way there is no contention for command connections, regardless of pod number. Pods can always connect, and get their assignments during registration or deregistration.

Additional Example Systems and/or Methods

In a first example, a method of switching operational modes in a device of an audio system, the method comprises: executing, by a processor of the device, first instructions from a first memory corresponding to operation in a first mode, receiving, at the device, a signal to switch modes, and, responsive to receiving the signal, executing, by the processor, second instructions from a second memory corresponding to operation in a second mode.

A second example includes the first example, and further includes the method, wherein the first mode is a portable part mode and the second mode is a fixed part mode.

A third example includes the first example and/or the second example, and further includes the method, wherein the device is configured to operate as a Digital Enhanced Cordless Telecommunications (DECT) portable part in the portable part mode, and/or wherein the device is configured to operate as a DECT fixed part in the fixed part mode.

A fourth example includes one or more of the first example through the third example, and further includes the method, wherein the signal is an infrared signal received from a remote device responsive to user input at the remote device.

A fifth example includes one or more of the first example through the fourth example, and further comprises, responsive to receiving the signal, changing, with the processor, a bit in a field-programmable gate array (FPGA) of the device and resetting the FPGA.

A sixth example includes one or more of the first example through the fifth example, and further comprises, responsive to receiving the signal, setting respective select signals for the first and second memories using a switch.

A seventh example includes one or more of the first example through the sixth example, and further comprises, responsive to receiving the signal, selecting an address pin associated with the second memory using the switch.

An eighth example includes one or more of the first example through the seventh example, and further comprises starting, with the FPGA, a reset timer and asserting an associated timer signal to the processor.

A ninth example includes one or more of the first example through the eighth example, and further comprises releasing the timer signal responsive to the reset timer reaching a threshold time interval.

A tenth example includes one or more of the first example through the ninth example, and further comprises entering a registration mode for performing a Digital Enhanced Cordless Telecommunications (DECT) registration of a portable device responsive to a single button press received at the portable device.

An eleventh example includes one or more of the first example through the tenth example, and further comprises entering a registration mode for performing a Digital Enhanced Cordless Telecommunications (DECT) registration of a portable device responsive to receiving a registration signal from a charging cradle for the portable device.

A twelfth example includes one or more of the first example through the eleventh example, and further comprises the method, wherein the charging cradle is configured to trigger the sending of the registration signal by detecting the presence of the portable device based on current drawn through charge contacts of the charging cradle.

A thirteenth example includes one or more of the first example through the twelfth example, and further includes the method, wherein the charging cradle is configured to trigger the sending of the registration signal by generating a negative pulse on all cradle charger slot of the charging cradle and to detect the presence of any portable devices seated in the cradle charger.

A fourteenth example includes one or more of the first example through the thirteenth example, and further includes the method, wherein the negative pulse is generated on all of the slots in a round robin manner.

A fifteenth example includes one or more of the first example through the fourteenth example, and further includes the method, wherein the negative pulse is generated responsive to a user input.

A sixteenth example includes one or more of the first example through the seventeenth example, and further includes the method, wherein the user input comprises user selection of a button on the charging cradle.

A seventeenth example includes one or more of the first example through the sixteenth example, and further includes the method, wherein the device includes the charging cradle.

An eighteenth example includes a method of registering a portable device with a fixed part device in an audio system, the method comprising: entering, at the fixed part device, a registration mode for performing a registration and/or pairing of the portable device responsive to a single button press and/or a detection of a presence of the portable device in a charging cradle.

A nineteenth example includes at least the eighteenth example, and further includes the method, wherein the registration and/or pairing includes establishment of a WIFI connection between the portable device and the fixed part device.

A twentieth example includes at least the eighteenth example and/or the nineteenth example, and further includes the method, wherein the registration and/or pairing includes a Digital Enhanced Cordless Telecommunications (DECT) registration of the portable device with the fixed part device.

A twenty-first example includes one or more of the eighteenth example through the twentieth example, and further includes the method, wherein the single button press is provided by a user to the portable device or the charging cradle and wherein the registration and/or pairing is completed without further input from the user.

A twenty-second example includes one or more of the eighteenth example through the twenty-first example, and further includes the method, wherein the charging cradle is configured to trigger the sending of the registration signal by detecting the presence of the portable device based on current drawn through charge contacts of the charging cradle.

A twenty-third example includes one or more of the eighteenth example through the twenty-second example, and further includes the method, wherein the charging cradle is configured to trigger the sending of the registration signal by generating a negative pulse on all cradle charger slot of the charging cradle and to detect the presence of any portable devices seated in the cradle charger.

A twenty-fourth example includes one or more of the eighteenth example through the twenty-third example, and further includes the method, wherein the negative pulse is generated on all of the slots in a round robin manner.

A twenty-fifth example includes one or more of the eighteenth example through the twenty-fourth example, and further includes the method, wherein the negative pulse is generated responsive to a user input.

A twenty-sixth example includes one or more of the eighteenth example through the twenty-fifth example, and further includes the method, wherein the user input comprises user selection of a button on the charging cradle.

A twenty-seventh example includes a switchable part device in an audio system, the switchable part device comprising: a processor, a first memory storing instructions associated with a first operating mode, a second memory storing instructions associated with a second operating mode, and a field-programmable gate array (FPGA) configured to switch operation of the switchable part device between the first operating mode and the second operating mode by switching select signals corresponding to the first and second memory.

A twenty-eighth example includes the twenty-seventh example and further includes the switchable part device, wherein the first and second memory are each non-volatile memory.

A twenty-ninth example includes the twenty-seventh example and/or the twenty-eighth example, and further includes the switchable part device, wherein the FPGA includes a mode select bit that is set by the processor responsive to receipt of a signal to initiate a mode switching operation.

A thirtieth example includes one or more of the twenty-seventh example through the twenty-ninth example, and further includes the switchable part device, wherein the FPGA is configured to start a reset timer responsive to the mode select bit being changed, and to assert a timer signal to the processor until the timer reaches a predetermined time.

A thirty-first example includes a distributed audio system including the switchable part device of any one or more of the twenty-seventh example through the thirtieth example.

A thirty-second example includes the switchable part device of any one or more of the twenty-seventh example through the thirtieth example, wherein the switchable part device is configured to perform the method of any one or more of the first example through the twenty-sixth example.

CONCLUSION

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims and their equivalents. We therefore claim all that comes within the scope and spirit of these claims.

We claim:

1. A method of switching operational modes in a device of an audio system, the method comprising:
   executing, by a processor of the device, first instructions from a first memory corresponding to operation in a first mode;
   receiving a signal to switch modes;
   responsive to receiving the signal, switching, with a field-programmable gate array (FPGA), a select signal corresponding to the first memory to select a second memory;
   starting, with the FPGA, a reset timer and asserting an associated timer signal to the processor, and releasing the associated timer signal responsive to the reset timer reaching a threshold time interval; and
   responsive to selecting the second memory, executing, by the processor, second instructions from the second memory corresponding to operation in a second mode.

2. The method of claim 1, wherein the first mode is a portable part mode and the second mode is a fixed part mode.

3. The method of claim 2, wherein the device is configured to operate as a Digital Enhanced Cordless Telecommunications (DECT) portable part in the portable part mode, and wherein the device is configured to operate as a DECT fixed part in the fixed part mode.

4. The method of claim 1, wherein the signal is an infrared signal received from a remote device responsive to user input at the remote device.

5. The method of claim 1, wherein switching the select signal comprises, responsive to receiving the signal, changing, with the processor, a bit in the FPGA of the device and resetting the FPGA.

6. The method of claim 5, further comprising, responsive to receiving the signal, selecting an address pin associated with the second memory using a switch.

7. The method of claim 1, further comprising entering a registration mode for performing a Digital Enhanced Cordless Telecommunications (DECT) registration of a portable device responsive to a single button press received at the portable device or responsive to receiving a registration signal from a charging cradle for the portable device.

8. The method of claim 7, wherein the charging cradle is configured to trigger a sending of the registration signal by detecting a presence of the portable device based on current drawn through charge contacts of the charging cradle.

9. The method of claim 7, wherein the registration or pairing includes establishment of a WIFI connection between the portable device and a fixed part device.

10. The method of claim 7, wherein the registration or pairing includes a Digital Enhanced Cordless Telecommunications (DECT) registration of the portable device with a fixed part device.

11. A switchable part device in an audio system, the switchable part device comprising:
    a processor;
    a first memory storing instructions associated with a first operating mode;
    a second memory storing instructions associated with a second operating mode; and
    a field-programmable gate array (FPGA) configured to switch operation of the switchable part device between the first operating mode and the second operating mode by switching select signals corresponding to the first and second memory, the FPGA further configured to start a reset timer and assert an associated timer signal to the processor, and release the associated timer signal responsive to the reset timer reaching a threshold time interval.

12. The switchable part device of claim 11, wherein the first and second memory are each non-volatile memory.

13. The switchable part device of claim 11, wherein the FPGA includes a mode select bit that is set by the processor responsive to receipt of a signal to initiate a mode switching operation.

14. The switchable part device of claim 13, wherein the FPGA is configured to start the reset timer responsive to the mode select bit being changed, and to assert the associated timer signal to the processor until the reset timer reaches a predetermined time corresponding to the threshold time interval.

15. A distributed audio system comprising:
  a switchable part device in an audio system, the switchable part device comprising:
  a processor;
  a first memory storing instructions associated with a first operating mode;
  a second memory storing instructions associated with a second operating mode; and
  a field-programmable gate array (FPGA) configured to switch operation of the switchable part device between the first operating mode and the second operating mode by switching select signals corresponding to the first and second memory, the FPGA further configured to start a reset timer and assert an associated timer signal to the processor, and release the associated timer signal responsive to the reset timer reaching a threshold time interval,
  wherein the first memory or the second memory further stores instructions executable by the process to enter a registration mode for performing a Digital Enhanced Cordless Telecommunications (DECT) registration of a portable device responsive to a single button press received at the portable device or responsive to receiving a registration signal from a charging cradle for the portable device.

16. The distributed audio system of claim 15, wherein the charging cradle is configured to trigger a sending of the registration signal by generating a negative pulse on all cradle charger slots of the charging cradle and to detect a presence of any portable devices seated in the charging cradle.

17. The distributed audio system of claim 16, wherein the negative pulse is generated on all of the cradle charger slots in a round-robin manner.

18. The distributed audio system of claim 17, wherein the negative pulse is generated responsive to a user input.

19. The distributed audio system of claim 15, wherein the switchable part device includes the charging cradle.

* * * * *